(12) United States Patent
Ramanujan et al.

(10) Patent No.: US 7,023,463 B2
(45) Date of Patent: *Apr. 4, 2006

(54) METHOD AND APPARATUS FOR PRINTING IMAGES FROM DIGITAL IMAGE DATA

(75) Inventors: Sujatha Ramanujan, Pittsford, NY (US); Julie K. Gerstenberger, Rochester, NY (US); Victor C. Wong, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/624,313

(22) Filed: Jul. 22, 2003

(65) Prior Publication Data

US 2005/0018038 A1    Jan. 27, 2005

(51) Int. Cl.
 *B41J 2/47* (2006.01)
(52) U.S. Cl. ................................ 347/239; 347/255
(58) Field of Classification Search ............. 347/218, 347/238–240, 244, 251–256, 258, 143–145, 347/241, 134–136; 250/353; 359/298; 430/124; 353/20; 355/53, 35; 369/575; 349/149

See application file for complete search history.

(56) References Cited

U.S. PATENT DOCUMENTS

| 3,858,046 | A | * | 12/1974 | Cubalchini | 250/353 |
|---|---|---|---|---|---|
| 4,624,558 | A | | 11/1986 | Johnson | 355/100 |
| 4,728,965 | A | | 3/1988 | Kessler et al. | 347/241 |
| 4,777,514 | A | | 10/1988 | Theer et al. | 355/54 |
| 5,019,858 | A | * | 5/1991 | Suzuki | 355/35 |
| 5,030,970 | A | | 7/1991 | Rau et al. | 347/243 |
| 5,055,871 | A | * | 10/1991 | Pasch | 355/53 |
| 5,325,137 | A | | 6/1994 | Konno et al. | 353/63 |
| 5,438,345 | A | * | 8/1995 | Hisaaki | 347/218 |
| 5,461,411 | A | | 10/1995 | Florence et al. | 347/240 |
| 5,481,398 | A | * | 1/1996 | Schoon | 359/323 |
| 5,502,532 | A | * | 3/1996 | Biesinger et al. | 396/575 |
| 5,504,514 | A | | 4/1996 | Nelson | 347/130 |
| 5,521,748 | A | | 5/1996 | Sarraf | 359/321 |
| 5,652,661 | A | | 7/1997 | Gallipeau et al. | 358/302 |
| 5,701,185 | A | | 12/1997 | Reiss et al. | 358/471 |
| 5,743,610 | A | | 4/1998 | Yajima et al. | 353/31 |
| 5,745,156 | A | | 4/1998 | Federico et al. | 347/256 |
| 5,808,800 | A | | 9/1998 | Handschy et al. | 359/630 |
| 5,940,204 | A | * | 8/1999 | Hewlett | 359/298 |
| 6,084,626 | A | * | 7/2000 | Ramanujan et al. | 347/239 |
| 6,215,547 | B1 | | 4/2001 | Ramanujan et al. | 355/67 |
| 6,480,259 | B1 | | 11/2002 | Wong et al. | 355/52 |
| 6,552,470 | B1 | | 4/2003 | Hodar | 310/317 |
| 6,580,490 | B1 | | 6/2003 | Wong et al. | 355/40 |

(Continued)

FOREIGN PATENT DOCUMENTS

EP    1 003 071 A2    5/2000

(Continued)

*Primary Examiner*—Hai Pham
(74) *Attorney, Agent, or Firm*—Nelson Adrian Blish

(57) ABSTRACT

An apparatus for printing images from digital image data onto a light sensitive medium disposed at an image plane which comprises a control logic processor capable of controlling the operation of the apparatus for printing based on the digital image data. An image forming assembly directs an exposure beam to the light sensitive medium disposed at the image plane. The image forming assembly (10) comprises a light source, a first lens assembly (41), a beamsplitter (50), a spatial light modulator (52), a temperature profile control apparatus (51) and a second lens assembly (132).

7 Claims, 21 Drawing Sheets

U.S. PATENT DOCUMENTS

| | | | |
|---|---|---|---|
| 6,739,723 B1 * | 5/2004 | Haven et al. | 353/20 |
| 6,776,489 B1 * | 8/2004 | Suzuki | 353/20 |
| 2003/0063247 A1 | 4/2003 | Kalyandurg | 349/149 |
| 2003/0085987 A1 * | 5/2003 | Kataoka et al. | 347/256 |
| 2003/0091924 A1 * | 5/2003 | Daimon et al. | 430/124 |

FOREIGN PATENT DOCUMENTS

| | | |
|---|---|---|
| EP | 1 285 769 A1 | 2/2003 |
| EP | 1 310 375 A1 | 5/2003 |

* cited by examiner

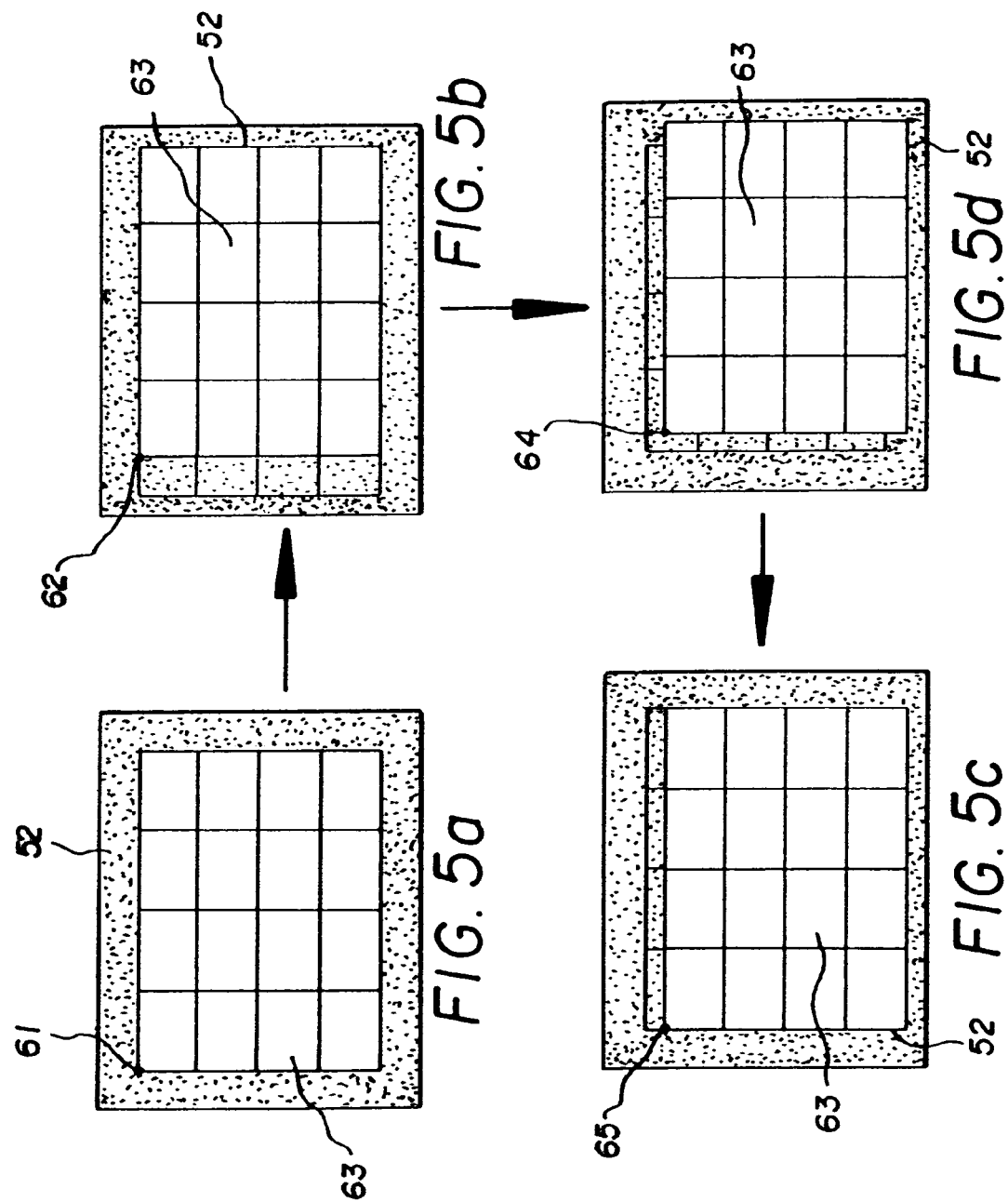

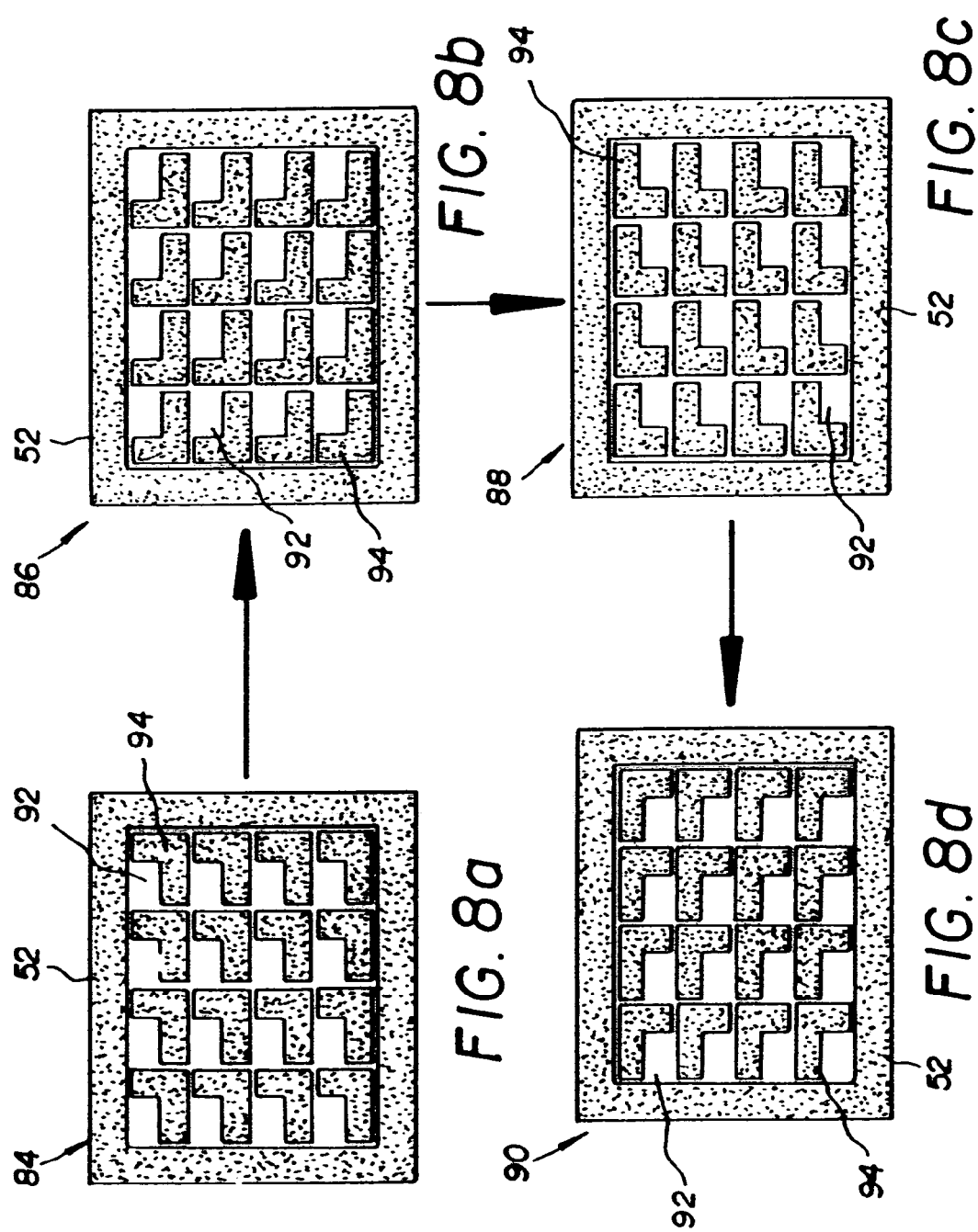

METHOD AND APPARATUS FOR PRINTING IMAGES FROM DIGITAL IMAGE DATA

CROSS REFERENCE TO RELATED APPLICATIONS

FIELD OF THE INVENTION

This invention relates generally to a printing apparatus and method for imaging onto photosensitive media by modulating a light beam, and more particularly to a film recording apparatus wherein a temperature profile of a spatial light modulator is controlled.

BACKGROUND OF THE INVENTION

Conventional printers generally adapted to record images provided from digital data onto photosensitive media apply light exposure energy that may originate from a number of different sources and may be modulated in a number of different ways. In photoprocessing apparatus, for example, light exposure energy can be applied from a CRT printer. In a CRT printer, the digital data is used to modulate a cathode ray tube (CRT) which provides exposure energy by scanning an electron beam of variable intensity along its phosphorescent screen. Alternately, light exposure energy can be applied from a laser printer, as is disclosed in U.S. Pat. No. 4,728,965 (Kessler et al.) In a laser-based printer, the digital data is used to modulate the duration of laser on-time or intensity as the beam is scanned by a rotating polygon onto the imaging plane.

CRT and laser printers perform satisfactorily for photoprocessing applications, that is, for printing of photographs for consumer and commercial markets. However, in an effort to reduce cost and complexity, alternative technologies have been considered for use in photoprocessing printers. Among suitable candidate technologies under development are two-dimensional spatial light modulators.

Two-dimensional spatial light modulators, such as those using a digital micromirror device (DMD) from Texas Instruments, Dallas, Tex., or using a liquid crystal device (LCD) can be used to modulate an incoming optical beam for imaging. A spatial light modulator can be considered essentially as a two-dimensional array of light-valve elements, each element corresponding to an image pixel. Each array element is separately addressable and digitally controlled to modulate incident light from a light source by, for instance, in the case of a LCD modulator, modulating the polarization state of the light. Polarization considerations are, therefore, important in the overall design of support optics for a spatial light modulator.

There are two basic types of spatial light modulators in current use. The first type developed was the transmissive spatial light modulator, which, as its name implies, operates by modulating an optical beam that is transmitted through individual array elements. The second type, a later development, is a reflective spatial light modulator. As its name implies, the reflective spatial light modulator operates by modulating a reflected optical beam through individual array elements. A suitable example of an LCD reflective spatial light modulator relevant to this application utilizes an integrated CMOS backplane, allowing a small footprint and improved uniformity characteristics.

Conventionally, LCD spatial light modulators have been developed and employed for digital projection systems for image display, such as is disclosed in U.S. Pat. No. 5,325,137 (Konno et al.) and in miniaturized image display apparatus suitable for mounting within a helmet or supported by eyeglasses, as is disclosed in U.S. Pat. No. 5,808,800 (Handschy et al.) LCD projector and display designs in use typically employ one or more spatial light modulators, such as using one for each of the primary colors, as is disclosed in U.S. Pat. No. 5,743,610 (Yajima et al.).

It is instructive to note that imaging requirements for projector and display use (as is typified in U.S. Pat. Nos. 5,325,137; 5,808,800; and 5,743,610) differ significantly from imaging requirements for printing. Projectors are optimized to provide maximum luminous flux to a screen, with secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, projection and display systems are optimized for viewing at typical resolutions such as 72 dpi or less, for example. Photographic printing apparatus, on the other hand, must achieve much higher resolution, particularly apparatus designed for micrographics applications, which can be expected to provide 8,000 dpi for some systems. Thus, while LCD spatial light modulators can be used in a range of imaging applications from projection and display to high-resolution printing, the requirements on supporting optics can vary significantly.

Largely because spatial light modulators can offer significant advantages in cost and size, these devices have been proposed for different printing systems, from line printing systems such as the printer depicted in U.S. Pat. No. 5,521,748 (Sarraf), to area printing systems such as the system described in U.S. Pat. No. 5,652,661 (Gallipeau et al.) One approach, using a Texas Instruments DMD as shown in U.S. Pat. No. 5,461,411 (Florence et al.) offers advantages common to spatial light modulator printing such as longer exposure times using light emitting diodes as a source as shown in U.S. Pat. No. 5,504,514 (Nelson). However, DMD technology is very specific and not widely available. As a result, DMDs may be expensive and not easily scaleable to higher resolution requirements. The currently available resolution using DMDs is not sufficient for all printing needs. Furthermore, there is no clear technology path to increased resolution with DMDs.

A preferred approach for photoprocessing printers uses an LCD spatial light modulator. Liquid crystal modulators can be a low cost solution for applications requiring spatial light modulators. Photographic printers using commonly available LCD technology are disclosed in U.S. Pat. Nos. 5,652,661; 5,701,185 (Reiss et al.); and U.S. Pat. No. 5,745,156 (Federico et al.) Although the present application primarily addresses use of LCD spatial light modulators, references to LCD in the subsequent description can be generalized, for the most part, to other types of spatial light modulators, such as the DMD noted above.

Primarily because of their early development for and association with screen projection of digital images, spatial light modulators have largely been adapted for continuous tone (contone) color imaging applications. Unlike other digital printing devices, such as the CRT and laser-based devices mentioned above that scan a beam in a two-dimensional pattern, spatial light modulators image one complete frame at a time. Using an LCD, the total exposure duration and overall exposure energy supplied for a frame can be varied as necessary in order to achieve the desired image density and to control media reciprocity characteristics. Advantageously, for photoprocessing applications, the capability for timing and intensity control of each individual pixel allows an LCD printer to provide grayscale imaging.

Most printer designs using LCD technology employ the LCD as a transmissive spatial light modulator, such as is disclosed in U.S. Pat. Nos. 5,652,661 and 5,701,185. However, the improved size and performance characteristics of reflective LCD arrays have made this technology a desirable alternative for conventional color photographic printing, as is disclosed in U.S. Pat. No. 6,215,547 (Ramanujan et al.) As is described in U.S. Pat. No. 6,215,547, color photographic printing requires multiple color light sources applied in sequential fashion. The supporting illumination optics are required to handle broadband light sources, including use of a broadband beamsplitter cube. The optics system for such a printer must provide telecentric illumination for color printing applications. In summary, in the evolution of photoprocessing systems for film printing, as outlined above, it can be seen that the contone imaging requirements for color imaging are suitably met by employing LCD spatial light modulators as a solution.

Printing systems for micrographics or computer output microfilm (COM) imaging, diagnostic imaging, and other specialized monochrome imaging applications present a number of unique challenges for optical systems. In the COM environment, images are archived for long-term storage and retrievability. Unlike conventional color photographic images, microfilm archives, for example, are intended to last for hundreds of years in some environments. This archival requirement has, in turn, driven a number of related requirements for image quality. For image reproduction quality, for example, one of the key expectations for micrographics applications is that all images stored on archival media will be written as high-contrast black and white images. Color film is not used as a medium for COM applications since it degrades much too quickly for archive purposes and is not capable of providing the needed resolution. Grayscale representation, meanwhile, has not been available for conventional micrographics printers. Certainly, bitonal representation is appropriate for storage of alphanumeric characters and for standard types of line drawings such as those used in engineering and utilities environments, for example. In order to record bitonal images onto photosensitive media, exposure energy applied by the printer is either on or off, to create high-contrast images without intermediate levels or grayscale representation.

In addition to the requirement for superb contrast is the requirement for high resolution of COM output. COM images, for example, are routinely printed onto media at reductions of 40× or more. Overall, micrographics media is designed to provide much higher resolution than conventional dye-based media provides for color photographic imaging. To provide high resolution, micrographics media employs a much smaller AgX grain size in its photosensitive emulsion. Optics components for COM systems are correspondingly designed to maximize resolution, more so than with optical components designed for conventional color photoprocessing apparatus.

Conventional COM printers have utilized both CRT and laser imaging optics with some success. However, there is room for improvement. For example, CRT printers for COM use, such as disclosed in U.S. Pat. No. 4,624,558 (Johnson) are relatively costly and can be bulky. Laser printers, such as disclosed in U.S. Pat. No. 4,777,514 (Theer et al.) present size and cost constraints and can be mechanically more complex, since the laser imaging system with its spinning polygon and beam-shaping optics must be designed specifically for the printer application. In addition, laser printers exhibit high-intensity reciprocity failure when used with conventional photosensitive media, thus necessitating the design of special media for COM use.

More recent technologies employed for COM imaging include use of linear arrays such as linear light-emitting diode (LED) arrays, for example, as are used in the Model 4800 Document Archive Writer, manufactured by Eastman Kodak Company, Rochester, N.Y. Another alternative is use of a linear light-valve array, such as is disclosed in U.S. Pat. No. 5,030,970 (Rau et al.) However, with exposure printheads using linear arrays, COM writers continue to be relatively expensive, largely due to the cost of support components and to the complexity of drive electronics. There is a long-felt need to lower cost and reduce size and complexity for COM devices, without sacrificing performance or robustness.

A well-known shortcoming of conventional COM printers relates to the use of microfilm for standard document page sizes. Conventionally, microfilm has been used for 11×14 inch computer output documents, for letter-sized documents (8.5×11 inches) or for A4 size documents (approximately 8.27×11.69 inches, 210×297 mm). Standard 16 mm microfilm allows documents having these sizes to be reduced by suitable factors, typically ranging from 20× to 50× reduction. Using different reduction ratios, documents can be arranged in different ways along the film. For conventional 16 mm film, there are standard simplex or "1-up" arrangements at lower reduction ratios and "2-up" arrangements at higher reduction ratios, with ratios often commonly agreed upon by COM equipment and media manufacturers. However, the use of 16 mm microfilm severely constrains the maximum size of documents that can be faithfully preserved in reduced form. For storage of larger documents, such as A2 size (16.54×23.39 in, 420×594 mm) or larger, 16 mm microfilm is unsatisfactory.

To store larger documents, a larger format microfilm, such as 35 mm microfilm, may be more appropriate. The larger 35 mm format allows high-quality digital printing of A2 and larger documents onto COM media at standard reduction ratios. For example, engineering drawings that have traditionally been archived using aperture cards may now be conveniently stored on 35 mm microfilm using digital COM film writers.

Relatively new for digital printing applications, the 35 mm film allows greater potential flexibility not only for storage of larger documents, but also where documents may need to be stored at lower reduction ratios. Some types of documents, for example, may have image content such as fine lines or highly detailed areas that cannot be faithfully preserved at 24:1 or greater reduction. Both for larger documents at high reduction ratios and for smaller documents, the 35 mm media also allows enhanced flexibility, allowing alternate arrangements of images on the COM media. For example, different arrangements could be proposed for storing color separations, such as red, green, and blue additive color separations or cyan, magenta, and yellow subtractive color separations, where the separations themselves are printed on COM media in monochromatic or grayscale form.

Some types of COM printing apparatus have been designed to print onto the larger 35 mm microfilm media and thereby provide the advantages that result from enhanced flexibility of image formats. As one example, the Microbox Polycom Laser Plotter manufactured by Microbox, located in Bad Nauheim, Germany is a COM imaging apparatus employing laser scanning, designed to use 35 mm format. However, conventional COM printing apparatus that are designed for imaging onto the larger-format 35 mm media do not provide efficient and affordable solutions for imaging onto the smaller-format 16 mm media. Using conventional COM imaging optics, the cost and complexity of a COM printing apparatus can be prohibitive. For example, when compared against optical requirements for 16 mm imaging, use of the larger 35 mm format requires proportionally larger beam incident angles in an apparatus using scanning techniques such as laser and CRT devices employ. Complex and expensive optical components are needed in order to suppress the effects of increased aberration. In rotating polygon systems, for example, motion-induced optical artifacts are substantially more pronounced when imaging in a larger 35 mm format. In the case of linear array printing methods, extending printhead length to suit the larger 35 mm format also requires considerably more cost and complexity than are needed for 16 mm imaging.

In addition to cost and complexity disadvantages of conventional 35 mm COM imaging apparatus, conventional COM imaging approaches make these apparatus inherently less efficient for smaller-format 16 mm imaging. There are no throughput benefits in imaging to a smaller-format COM media, since conventional scanning designs fix scan sequences, sweep angles, and timing to suit larger-format media. Likewise for linear array imaging devices, imaging onto a smaller-format media is less efficient, since only a portion of the available printhead optics can be used. The above-mentioned drawbacks of increased cost and complexity and reduced efficiency render conventional approaches unsatisfactory for variable-format COM imaging in a cost-sensitive and efficiency-driven market.

A further drawback of conventional COM imaging approaches relates to productivity constraints inherent to scanning and to line array imaging devices. Conventional COM imaging methods, which operate generally by exposing pixels in a line-by-line fashion, are not easily adapted to take advantage of expanded possibilities for using varied imaging formats and of opportunities for writing multiple images in a single exposure.

An attempt at designing an apparatus capable of addressing these needs was presented in U.S. Pat. No. 6,552,740 (Wong et al.) which depicts a monochromatic printer based on spatial light modulator technology. Prior art U.S. Pat. No. 6,580,490 (Wong et al.) also demonstrates the use of a liquid crystal on Silicon (LCOS) device for printing in multiple formats. U.S. Pat. No. 6,480,259 (Wong et al.) depicts a printer capable of selecting light sources. However, LCOS devices and the surrounding optical system are thermally sensitive. While the prior art printer can create images at an image plane, variations in temperature at the LCOS device can alter the image uniformity and quality. Knowledge of this effect can be utilized to improve the design by not only controlling the temperature gradients to prevent unwanted uniformity changes, but to correct uniformity errors already present in the printing system.

Thus, it can be seen that there is a need for an improved COM printing apparatus that is inexpensive, compact, and robust, and that allows printing in any of a plurality of output media formats, including printing of multiple images at one time while maintaining thermal control of the system.

An additional application within the field of printing is that of printing of x-ray images. X-ray images are printed on dry silver media as well as wet processed silver. These black and white images are created through infra-red exposure. Available printers for imaging the digital data on dry silver media include laser based printers. With the increase in digital capture, the need for low cost, high speed engines for writing on dry silver will increase. Use of spatial light modulators in such printing applications will help reduce cost. In additions, dry silver media is thermally processed. Consequently, care must be taken to provide a thermally controlled environment at the media.

Thus, it can be seen that there is a need for an improved printing apparatus that is inexpensive, compact, and robust, and that is thermally controlled for optimal use.

SUMMARY OF THE INVENTION

It is an object of the present invention to provide a printing apparatus using a spatial light modulator for imaging onto a photosensitive medium, where thermal control is maintained for improved image quality.

With the above object in mind, the present invention provides a printing apparatus for recording an image from digital image data onto a photosensitive medium disposed at an image plane, wherein the photosensitive medium presents, at the image plane, a width dimension that is selected from of a plurality of width dimensions, the printing apparatus comprising:

(a) a media supply adapted to supply, at the image plane, the photosensitive medium;

(b) a control logic processor capable of controlling the operation based on the digital image data;

(c) an image forming assembly for directing, onto the photosensitive medium disposed at the image plane, an exposure beam for printing, the image forming assembly comprising:

(1) a light source for providing light exposure energy for imaging onto the light sensitive medium;

(2) a first lens assembly for directing the light exposure energy to a spatial light modulator;

(3) a beamsplitter which directs the light exposure energy to the spatial light modulator;

(4) the spatial light modulator having a plurality of individual elements capable of modulating the state of the light exposure energy to provide an exposure beam for printing, a state of each of the elements controlled by the control logic processor according to the digital image data;

(5) a temperature profile control apparatus for controlling a temperature profile of the spatial light modulator; and (6) a second lens assembly for directing the exposure beam onto the light sensitive medium.

According to an aspect of the present invention, exposure light is passed through a uniformizer or integrator to provide a source of spatially uniform, light for the printing apparatus. The light is then polarized and passed through a beamsplitter, which directs a polarized beam onto a spatial light modulator. Individual array elements of the spatial light modulator, controlled according to digital image data, are turned on or off in order to modulate the polarization rotation of the incident light. Modulation for each pixel can be effected by controlling the level of the light from the light source, by control of the drive voltage to each individual pixel in the spatial light modulator, or by controlling the duration of on-time for each individual array element. The resulting light is then directed through a lens assembly to expose the photosensitive medium.

An advantage of the present invention is that it allows a single monochrome printing apparatus to be used with microfilm having one of a set of allowed widths. A COM equipment operator using a printer of the present invention has the option to load photosensitive media having dimensions that best suit the type of documents being stored.

A further advantage of the present invention is that it provides potential productivity gains by allowing a COM printer to print by exposing multiple separate images onto photosensitive medium at one time. This can allow writing multiple images simultaneously to the same COM film or to two separate films loaded in the COM printer.

A further advantage of the present invention is that it provides the flexibility for imaging in multiple output formats without increasing the complexity or cost of the optical system.

A further advantage of the present invention is that it allows larger format COM imaging without compromising throughput speed.

A further advantage of the present invention is improved image quality through thermal control of the temperature profile at the spatial light modulator.

A further advantage of the device is improved image quality through thermal control of the optical elements.

A further advantage of the system is use in thermally processed printing applications through temperature control at the media plane.

These and other objects, features, and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5a–5d illustrate the effect of dithering an un-apertured spatial light modulator using four distinct image positions;

FIGS. 8a–8d illustrate the effect of dithering an apertured spatial light modulator using four distinct image positions;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It must be noted that the following description focuses primarily on COM applications. However, the method and design disclosed herein can be employed with other types of digital printers, including polychromatic applications as well as infrared printers. In general, the design disclosed herein is well suited for printing two dimensional swaths.

Figure 1:
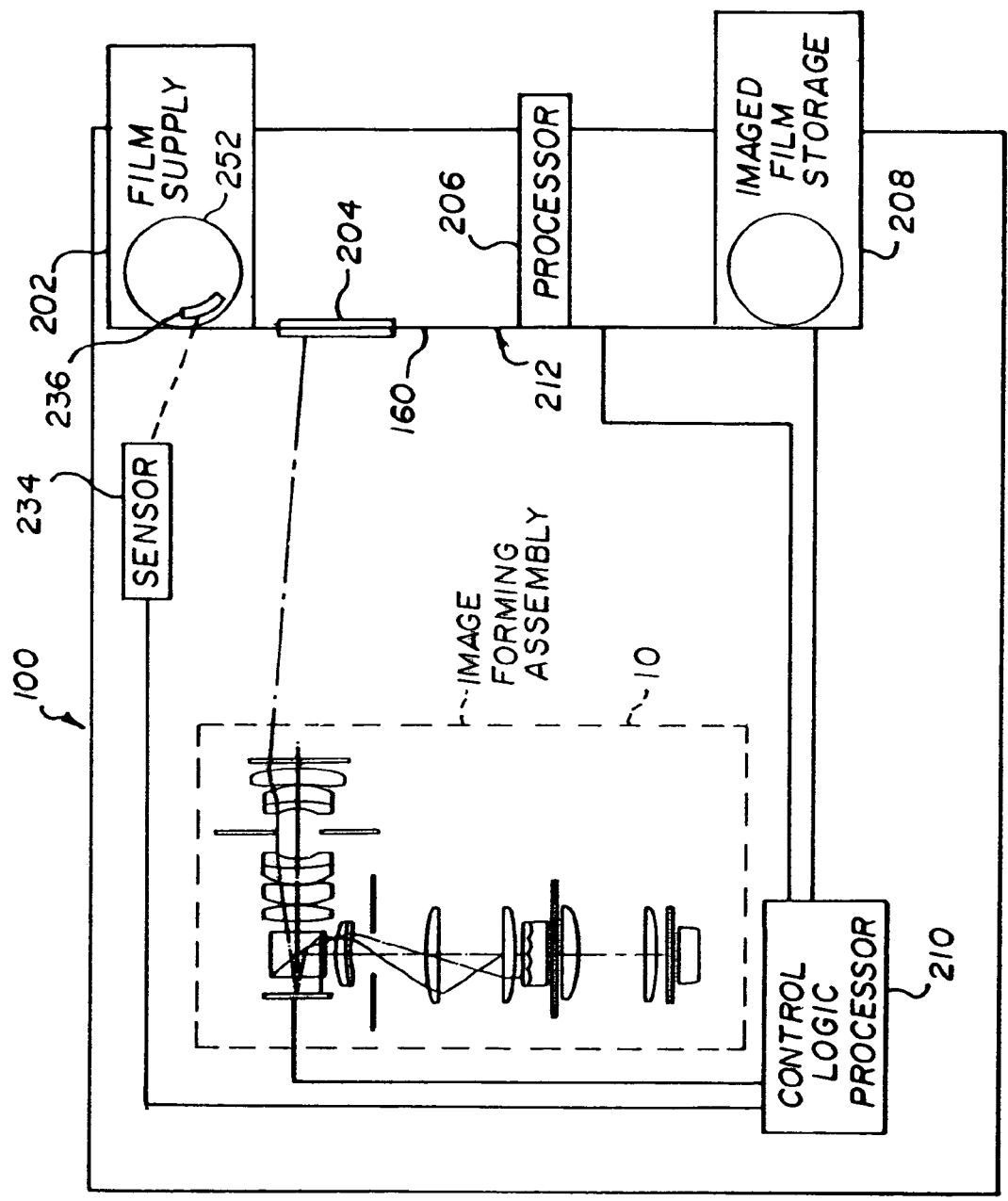
FIG. 1 is a schematic view showing a printing apparatus of the present invention.

Referring now to the drawings, wherein like reference numerals represent identical or corresponding parts throughout the several views, FIG. 1 illustrates an archival printer according to the present invention, such as a COM printer, referred to in general by numeral 100. Printer 100 comprises an image forming assembly 10 and a media handling subsystem 212. Media handling subsystem 212 comprises a media supply 202, which is typically a film supply, an exposure section 204, an optional film processor 206, and a film storage unit 208. A control logic processor 210, such as a microprocessor or other computer adapted to control printer 100, accepts and processes image data for printer 100 and controls the overall operation of image forming assembly 10 and media handling subsystem 212 components. The operation of printer 100 is straightforward, following the general pattern used for COM printers overall. To print, an undeveloped section of a photosensitive media 160 is advanced from media supply 202 into exposure section 204. Image forming assembly 10 cooperates with control logic processor 210 to print image data onto photosensitive media 160. The exposed section of photosensitive media 160 is then ready for processing in order to develop the image. In one embodiment, in which printer 100 uses dry-processed media, film processor 206 may be built into printer 100 itself, as is represented in FIG. 1. The exposed section of photosensitive media 160 is advanced to film processor 206, where the latent exposed image is developed using a heat process. For printer 100 designed for aqueous (AgX) media, the image development function of processor 206 is carried out by a separate developing apparatus (not shown), using conventional silver-halide film development chemicals and techniques. For printer 100 using aqueous media, film storage unit 208 is typically a cassette, designed to keep the exposed photosensitive media 160 protected from ambient light and to provide a means for transfer of media 160 to the separate developing apparatus.

It is instructive to note that media supply 202 can provide COM media having a number of different sizes and formats. For example, media supply 202 could comprise a single roll 252 of photosensitive media 160 for imaging. Photosensitive media 160 could be, for example, 16 mm or 35 mm film. Alternately, media supply 202 could comprise multiple rolls 252 of photosensitive media 160, placed side by side. For example, media supply 202 could provide two rolls 252 of 16 mm film in juxtaposition for imaging, where two or more images are simultaneously exposed, as is described subsequently. Regardless of media dimensions or number of rolls 252, the general image processing sequence described herein would apply.

Figure 2:
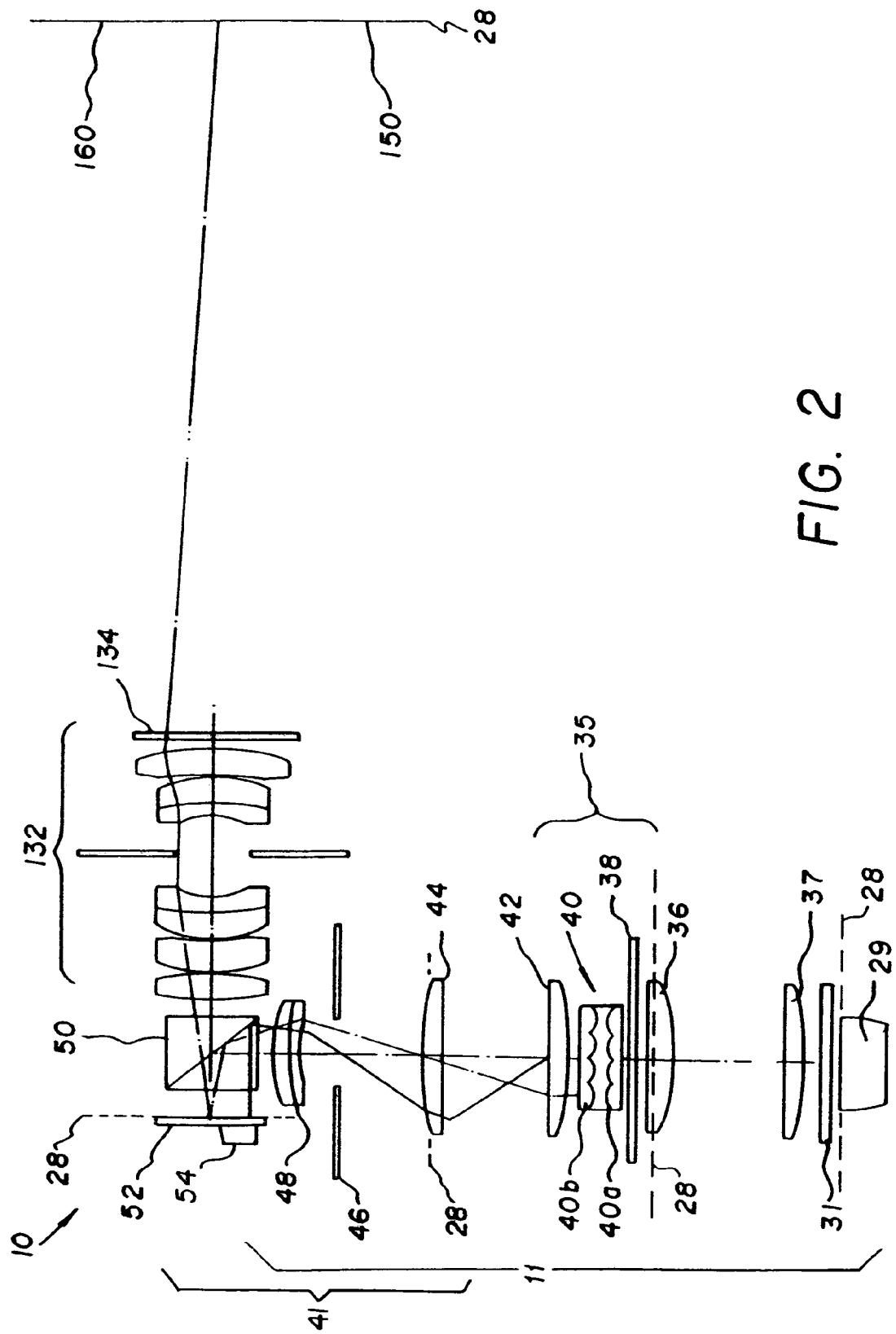
FIG. 2 is a schematic view showing image forming assembly components for a printing apparatus of the present invention.

Referring to FIG. 2, there is shown image forming assembly 10 which comprises illumination optics 11 and a first lens assembly 41. Illumination optics 11 comprises a light source 29 which is selectable and can be implemented using a number of types of lamp or electro-optical components, as is described subsequently. If light source 29 comprises a halogen lamp, it is advisable to incorporate a filter 31 or sequential filter such as a filter wheel 32 following the lamp assembly for selecting the appropriate wavelength band. For example, for a COM application an infrared rejecting filter may be necessary. For an application employing dry silver media, the filter may pass only the infrared following the lamp in the assembly, as shown in FIG. 2. Light emitted from light source 29 is focused by a lens 37 and directed to a uniformizer 35.

Uniformizer 35 comprises two field lenses 36 and 42 and a lenslet array assembly 40, acting as an uniformizer for the light. Lenslet array assembly 40 includes two lenslet arrays 40a and 40b. Lenses 36 and 37 direct the light into the entrance aperture of lenslet array assembly 40. Conjugate planes within image forming assembly 10 are indicated by dotted lines 28.

The light at the intermediate illumination plane is broken into a number of portions equivalent to the number of elements in lenslet array 40a. The individual portions are then imaged and magnified by second lenslet array 40b and second field lens 42. Light passing through uniformizer 35 is directed within first lens assembly 41 to a field lens 44, is passed through an optional aperture stop 46 and a relay lens 48. Relay lens 48 is positioned immediately before a polarization beamsplitter element 50. It should also be noted that, although relay lens 48 and field lens 44 are shown as separate elements in FIG. 2, a single compound lens (not shown) providing uniform illumination could be employed instead of the two individual lens elements 48 and 44 as is depicted in FIG. 2.

Because polarization beamsplitter element 50 may not provide adequate extinction between s-polarization state of light 142 (not shown) and p-polarization state of light 144 (not shown), an optional linear polarizer 38 may be incorporated prior to beamsplitter element 50. There are several places where a linear polarizer 38 can be placed; one such position is immediately preceding lenslet array assembly 40. Linear polarizer 38 is used to isolate the polarization state parallel to the axis of polarization beamsplitter element 50. This serves to reinforce the polarization state determined by polarization beamsplitter element 50, decrease leakage light and thereby increase the resulting contrast ratio. Referring again to FIG. 2, light of the s-polarization state 142 passing through polarization beamsplitter element 50 is directed to the plane of a reflective spatial light modulator 52, which is a reflective LCD in the preferred embodiment. The p-polarization state 144 is passed through beamsplitter element 50. A first lens assembly 41 for directing the polarized light to the spatial light modulator 52 comprises field lens 44, relay lens 48, and polarization beamsplitter element 50.

Figure 3:
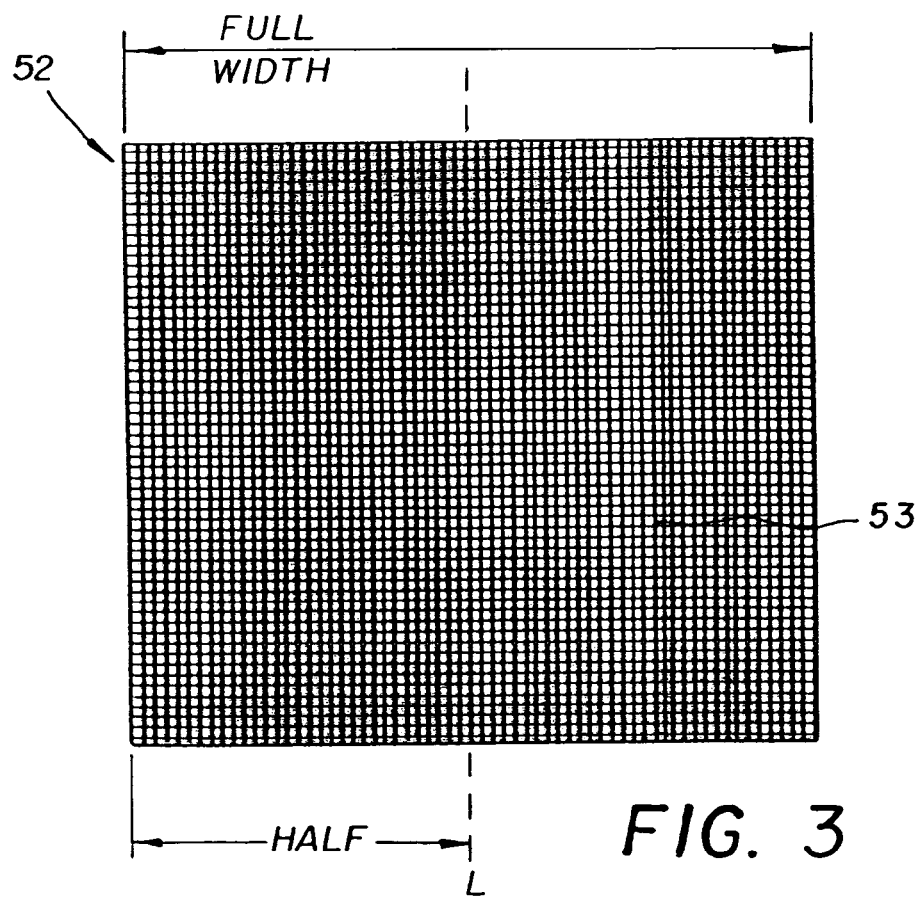
FIG. 3 is a plan view that illustrates a front surface of a multiple site spatial light modulator.

Referring to FIG. 3, spatial light modulator 52 of this system is designed for a two dimensional reflective polarization-based spatial light modulator. Spatial light modulator 52 includes a plurality of modulator sites 53, each of which can be individually modulated. Light passes through spatial light modulator 52, is reflected off the back reflective surface of spatial light modulator 52, and returns through spatial light modulator 52 to be directed through a second lens assembly 132, which acts as a print lens assembly, onto an image plane 150 (FIG. 2). If a modulator site 53 is "on" or bright, during the round-trip through spatial light modulator 52, the polarization state of the light is rotated. In an ideal case the light is rotated 90 degrees when site 53 is in an "on" state. However, this ideal degree of rotation is rarely easily achieved. If a given modulator site is "off" or dark, the light is not rotated. The light that is not rotated is not passed straight through beamsplitter element 50 but is redirected away from the media plane by polarization beamsplitter element 50. It should be noted that light which is rotated by spatial light modulator 52 may become elliptically polarized. Upon passing through a linear polarizer, the light will regain linearity. However, light that is not passed through a linear polarizer will retain ellipticity.

As noted above, the most readily available choice from among reflective polarization based modulators is the reflective liquid crystal modulator. Such modulators, originally developed for use in projection display, can have thousands of modulator sites along each orthogonal dimension, with footprints as small as a 0.9 inch diagonal. These high resolution reflective LCDs are often twisted nematic LCDs or homeotropically aligned reflective LCDs, although other types of reflective LCDs such as ferroelectric are often employed in projection display. Some of the key characteristics of these LCDs are high resolution, high contrast (>100:1), fast frame rate of 70 frames per second or higher, and high aperture ratios (>90%). In addition, the incorporation of a CMOS backplane increases the uniformity across the array. The LCDs are also capable of producing an eight bit or greater gray scale either through pulse width modulation or through analog operation. In either case data is introduced digitally to the printing system, as controlled by control logic processor 210 (FIG. 1). These characteristics ensure that the reflective LCD is an excellent choice for use in a reflective printing system.

Spatial light modulator 52 can be designed in a number of different configurations. The most amenable to a low cost printing system is a single chip system. In the preferred embodiment, spatial light modulator 52 would be a single-chip device having a large number of pixels, specifically designed for single color use, providing optimum frame speed.

Because of cost and availability constraints, it may be necessary to use a specific design of spatial light modulator 52 that is not optimized for the wavelength used. In such a case, there are methods for obtaining optimum performance. For example, for a given liquid crystal composition, thickness, and applied voltage, the resulting polarization rotation on an incident beam may vary with wavelength so that the efficiency and contrast of the modulation can vary as a function of wavelength. In the bright, or "on" state, this difference in rotation can effect the efficiency of the system. In other words, the percentage of incident light that is actually rotated and imaged on the media plane can vary. This difference in wavelength efficiency can be accounted for by adapting the illumination strength and exposure time, based on wavelength, in order to obtain the power density required by the media, using techniques well-known in the imaging art. The problem is particularly acute in the dark or "off state." In this state, the light is not rotated and should not be directed though polarization beamsplitter element 50 and imaged. If the light is in fact, rotated, light will leak through the imaging system and decrease the contrast.

Figure 4:
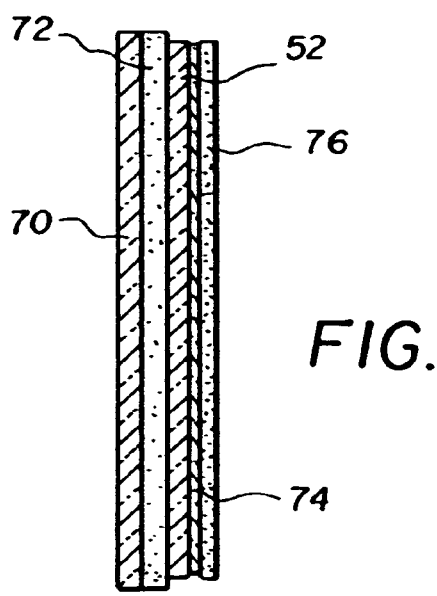
FIG. 4 shows a cross-section of a reflective modulator with motion controllers, a liquid crystal spatial light modulator, a cover glass, and a polarization compensation component.

In an alternate embodiment, contrast can be adjusted for wavelength using polarization compensation or selection devices. Referring to FIG. 4, in which a cross-sectional view of spatial light modulator 52 is shown, a polarization compensator 76 may be introduced to the surface of spatial light modulator 52. As shown in FIG. 4, the top surface or layer includes compensator 76, the second surface or layer is a cover glass 74 of spatial light modulator 52, the third layer is spatial light modulator 52 itself, with a reflective backplane. Behind spatial light modulator 52 are mounted actuators 70, 72 or mounts for actuators to position spatial light modulator 52.

An alternate method for contrast adjustment is to incorporate a polarization compensator in the path of the optical beam to correct the polarization state of the light. A single compensator may be placed in the optical path to particularly correct the off-state of the light. However, polarization compensation devices can be expensive. An efficient but inexpensive means to accomplish the same results can be obtained using linear polarizers. As was mentioned earlier, a single LCD imparts a degree of polarization rotation dependent on the color of illumination. In an effort to maximize contrast, special care must be taken to provide a truly dark "off state". Because the rotation of the light from spatial light modulator 52 is not always crossed perfectly with beamsplitter element 50 in the off state, additional polarization selection must be incorporated into the optical path. Also, polarization beamsplitter element 50 is not perfect and will leak some amount of light. For these reasons, an additional sheet polarizer can be disposed either immediately before or after second lens assembly 132. This additional polarizer serves to reject leakage light that is passed through polarization beamsplitter element 50. Specifically, for a particular LCD modulator, the dark state of the light is actually rotated 7 degrees from the polarization transmitting direction of polarization beamsplitter element 50. To correct this in the preferred embodiment, a second polarizer 134 (FIG. 2) is provided, rotated 7 degrees off-axis to suppress leakage light. The particular angle at which polarizer 134 must be placed is a function of the particular reflective LCD chosen for the printing system. A suggested placement of polarizer 134 in the optics path is shown in FIG. 2.

Contrast modification is an application dependent adjustment. For the case of photographic printing, the required contrast may be quite low. The contrast need not be optimized. In some case it may even be reduced through the same mechanisms as contrast enhancement. For example, a waveplate or polarizer rotated off the optimal axis will reduce contrast.

Furthermore, in the case of polychromatic printing, the contrast requirement of the media varies as a function of wavelength. So, the system would be employed in a color sequential manner. Each color component would illuminate the device independently, and the contrast would be adjusted accordingly. Contrast adjustment can either be accomplished optically, or through the address of the modulator. The address voltage to the modulator can vary sequentially as a function of illumination wavelength.

Dithering

In an alternative embodiment of printer 100, dithering may be used to increase the inherent LCD resolution and to compensate for modulator site defects. A dithering pattern for a standard high aperture ratio LCD modulator 52 is shown in FIGS. 5a–5d.

To dither a full aperture LCD is to image the spatial light modulator 52 at one position, and reposition spatial light modulator 52 a fraction of a modulator site distance away and image. In so doing, multiple images are created and overlapped. By overlapping multiple images, the system acquires a redundancy that corrects for modulator site failure or drop out. Furthermore, by interpolating or updating with new data between positions, the effective resolution is increased. Referring to the example dithering scheme depicted in FIGS. 5a–5d, spatial light modulator 52 is first positioned at a first modulator position 61 and modulator sites 63 are positioned and imaged (FIG. 5a). Spatial light modulator 52 is then moved to a second modulator position 62 (FIG. 5b) which is one half of a modulator site laterally displaced from previous position 61. Spatial light modulator 52 is then imaged at position 62. Spatial light modulator 52 is then displaced one half of a modulator site longitudinally from previous position 62, which means it is diagonally displaced from initial position 61 to a third modulator position 64 (FIG. 5*d*). Modulator sites 63 are illuminated and the media exposed again. Spatial light modulator 52 is then moved to a fourth modulator position 65 that is laterally displaced from third position 64 (FIG. 5*c*). The media is then exposed at this position. Using this pattern, there is effectively a fourfold increase in the amount of data written. This serves to increase image resolution and provide means to further sharpen images. Alternately, with a high aperture ratio, it may be sufficient to simply dither in one diagonal direction (that is, for example, from first position 61 shown in FIG. 5*a* to third position 64 shown in FIG. 5*d*) in order to achieve suitable results.

Dithering requires motion of the modulator in at least one direction. Each increment of motion is approximately between 5 um and 20 um for a typical reflective LCD modulator. In order to achieve this incremental motion, many different actuator 54 or motion assemblies, as shown in FIG. 2, can be employed. For example, the assembly can use two piezo-electric actuators.

Figure 6:
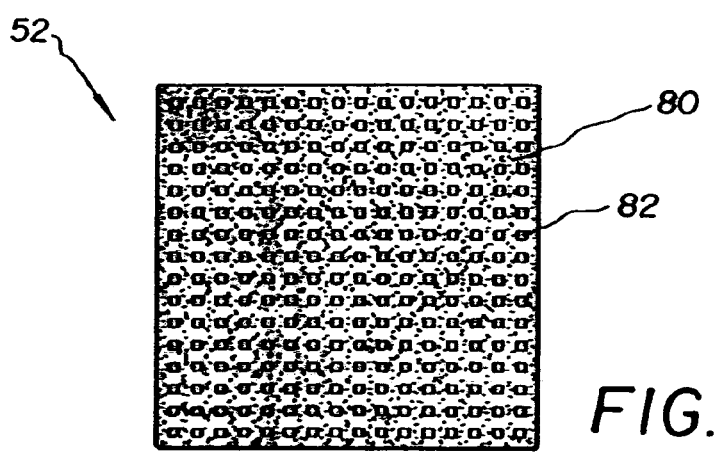
FIG. 6 is a plan view that illustrates a front surface of a sub-apertured spatial light modulator.

In an alternate embodiment for dithering, requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site. The result is a modulator site for which only a fraction of the area transmits light. Referring to FIG. 6, there is shown an illustration of a sub-apertured area modulator. Black regions 80 represent the non reflecting, non-transmitting regions of the device. Clear areas 82 represent the sub-apertured transmitting areas of the LCD.

Figure 7:
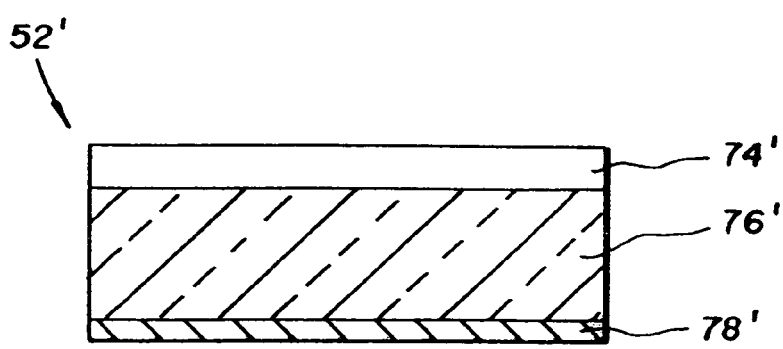
FIG. 7 is a cross-sectional view of a reflective spatial light modulator.

FIG. 7 is a cross-sectional view of an alternate two-dimensional LCD spatial light modulator 52'. There is a frame 78' which can be in the form of a CMOS backplane on top of which rests an LCD 76'. Above the LCD 76' is a cover glass 74'. Sub-apertures, to effect the pattern of FIG. 6, may exist as a mask in frame 78', as a pattern in LCD 76', or as a pattern on the surface of cover glass 74' closest to LCD 76'. In an effort to double the resolution in each direction, a sub-aperture of approximately 25% may be employed. By dithering a 25% aperture ratio device, it is possible to double the resolution in the image.

FIGS. 8*a*–8*d* represent the dithering of a sub-apertured device. Spatial light modulator 52 is positioned at a first modulator position 84 (FIG. 8*a*) and sub-apertured modulator sites 92 are positioned and exposed while darkened (non reflecting) regions 94 are not imaged onto photosensitive media 160. Spatial light modulator 52 is moved to a second modulator position 86 (FIG. 8*b*) a half full modulator site (sub-aperture and surrounding non-reflective area) laterally displaced from previous position 84. Spatial light modulator 52 is then exposed at position 86. Spatial light modulator 52 is then displaced a half a full modulator site longitudinally from previous position 86 to third modulator position 88 (FIG. 8*c*), which means it is diagonally displaced from the starting point at first modulator position 84. Spatial light modulator 52 is then illuminated and the media exposed again. Spatial light modulator 52 is then moved to a fourth modulator position 90 (FIG. 8*d*) that is laterally displaced from third position 88. The media is exposed at this position. Effectively, there is a four times increase in the amount of data written. This serves to increase image resolution and to provide means for further image sharpening. A sub-aperture of 25% by area, as approximated in FIG. 6, will give the highest image quality for a four step dither, however, in an effort to allow for redundancy in the modulator sites, it is better to use a sub-aperture ratio of greater than 25% by area.

When the sub-apertures are not placed symmetrically within each cell, dithering becomes quite difficult. Different periods of motion can be employed; for instance, one full modulator site width lateral motion combined with half a modulator site vertical motion makes a dither pattern. However, such motion is quite prone to image artifacts. A simple way to get around this problem is to dither using only odd columns, then repeat the dither using only even columns. Alternately, the dither algorithm may follow another pattern, dithering even rows, then dithering odd rows, for example.

Figure 9:
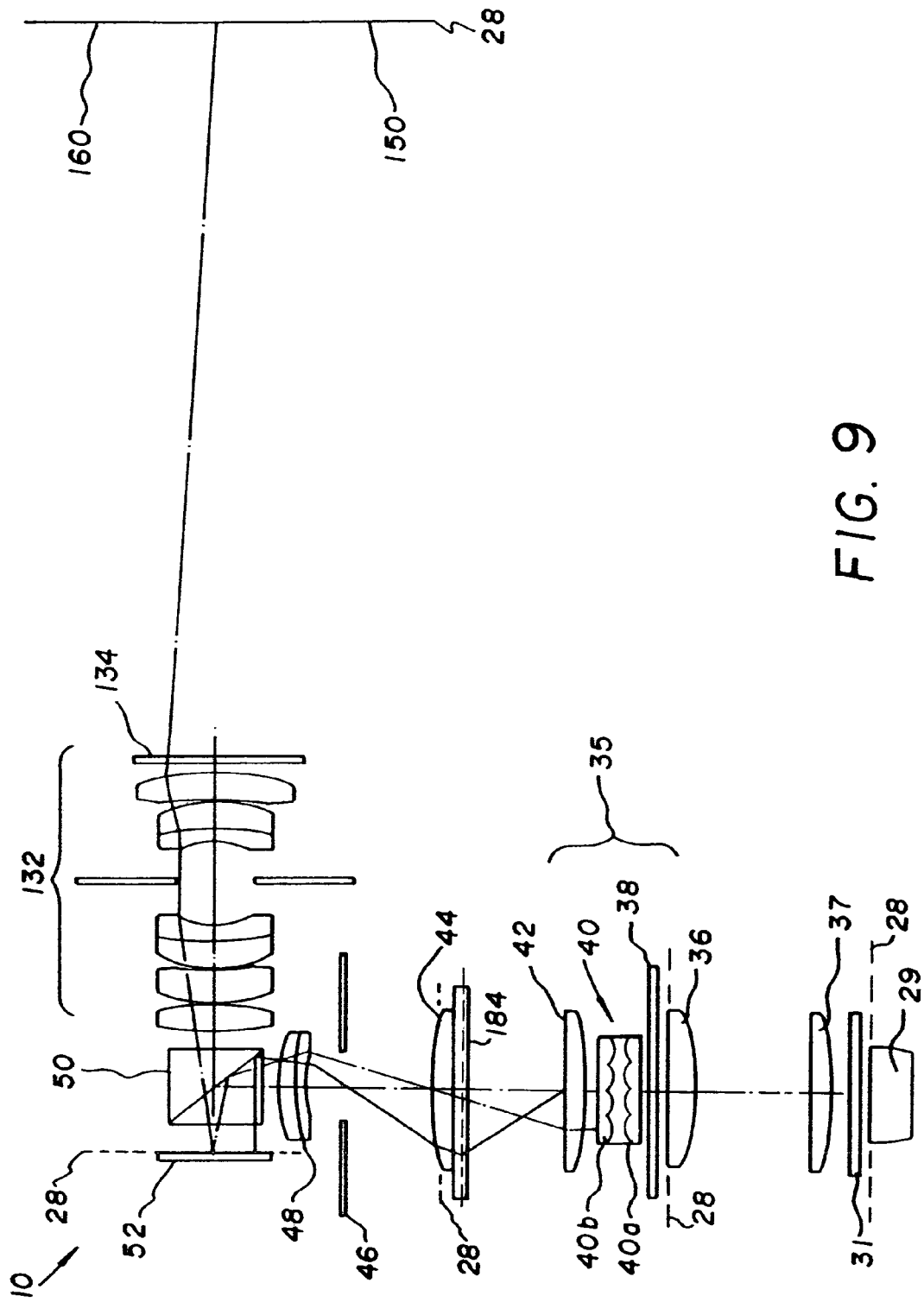
FIG. 9 is a schematic view showing image forming assembly components for a printing apparatus of the present invention, including an intermediate image plane for inclusion of a dither mask.

In an alternate embodiment, spatial light modulator 52 is left un-dithered. But, dithering takes place in one of conjugate image planes 28 as is shown in FIG. 9. In this conjugate plane 28 a mask 184 containing the sub-aperture is placed. It is mask 184 that is dithered while the information content to the modulator sites at spatial light modulator 52 is updated. This allows a sub-apertured image to be recorded although the device may not be sub-apertured. It is also possible to create an intermediate image plane, however, this will prove cumbersome.

Another means by which to accomplish the dithering through the use of mask 184 is to place mask 184 in the image plane immediately before media 160. This mask 184 can then be dithered while data is refreshed to the device between dither positions. This method of dither will accomplish the same effect as the previous method of the intermediate image.

Following spatial light modulator 52 and polarization beamsplitter element 50 in FIG. 1 is second lens assembly 132. Second lens assembly 132 provides the correct demagnification of the image of spatial light modulator 52 to image plane 150 where photosensitive media 160 is located. It should be noted that second lens assembly 132 can be configured for reduction (as is needed for micrographics in the preferred embodiment) or for magnification (as is needed for diagnostic imaging). The configuration of second lens assembly 132 components is dependent on how printer 100 is used. With this arrangement, the same illumination optics 11 and spatial light modulator 52 components can be used with different printer 100 types.

The optical system designed using the arrangement disclosed in FIG. 1 has been shown to be compact, low in cost, and efficient. The combination shown in FIG. 1, using a high intensity light source 29 and supporting illumination optics 11 with a reflective LCD spatial light modulator 52 and second lens assembly 132 optics optimized for COM-quality reduction, provides high levels of exposure energy suited to the resolution and contrast requirements of the micrographics environment. Moreover, because image forming assembly 10 is capable of providing high exposure energy, image forming assembly 10 allows printer 100 to use dry-process media when provided with a light source having sufficient power and wavelength characteristics, thereby providing performance and environmental benefits.

Achieving Grayscale Output

Printer 100 is capable of achieving sufficient uniformity while retaining the grayscale performance. Most spatial light modulators 52 alone can receive up to 8 bits of bit depth. However, 8 bits to the modulator may not translate to 8 bits at the media. Furthermore, LCD modulators are known to exhibit some measure of roll-off or loss of contrast at the edges of the device. To print an adequate grayscale range and provide additional bit depth, the present invention can take advantage of the fact that spatial light modulators 52 designed for projection display generally refresh data faster than is required for printing. Consequently, it is possible to create a single image at the media 160 as a super-position of a series of images. The individual images that comprise the final image can vary both in information content and illumination.

It is possible to maintain the same image data at spatial light modulator 52 and, by altering the illumination level from light source 29, introduce additional bit depth. By varying the illumination level, (and/or duration), and by altering the data content controlling spatial light modulator 52, printer 100 can build a composite image out of a series of preliminary images. The superposition of the images of varied information content and varied illumination level introduces additional bit depth to the composite image.

Non-uniformity Compensation

Using the present invention, printer 100 can control image forming assembly 10 to correct for some non-uniformity such as roll-off at spatial light modulator 52 edges. One way to accomplish this is to introduce additional image data to spatial light modulator 52, activating only individual modulator sites 53 on the outer edge of spatial light modulator 52. These added images can then be exposed and superimposed on the other images thus giving additional depth to the edge regions. An example method would be to scan a series of images taken at LCD spatial light modulator 52, create data maps and convolve all input data with an initial map of LCD spatial light modulator 52 to correct the image. Similar techniques can be used to adjust for modulator non-uniformities that are known prior to operation.

Thermal Compensation for Non-uniformity and Spatial Light Modulator Operation

The uniformity of a flat field projected from a spatial light modulator is directly related to the temperature of operation and the corresponding temperature profile. In particular, when using a LCOS device, there is an optimal operating temperature. The brightness (reflectance) as well as contrast are optimized at a given temperature. This temperature is often higher than room temperature. For example, the optimal temperature may be 45 C. It becomes necessary then to control the operating temperature of the device. As the temperature drifts, so will the device performance.

Figure 23A:
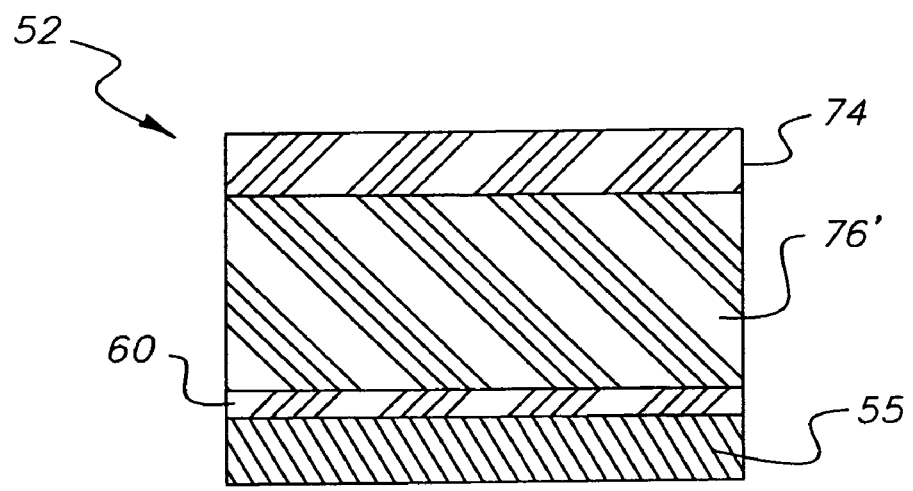
FIG. 23a is a side view of a spatial light modulator with TEC.
Figure 23B:
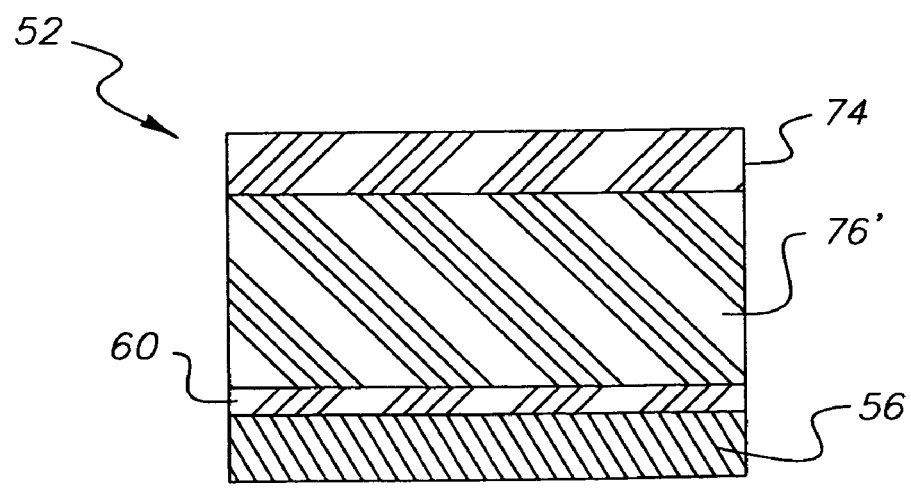
FIG. 23b is a side view of a spatial light modulator with heater.
Figure 23C:
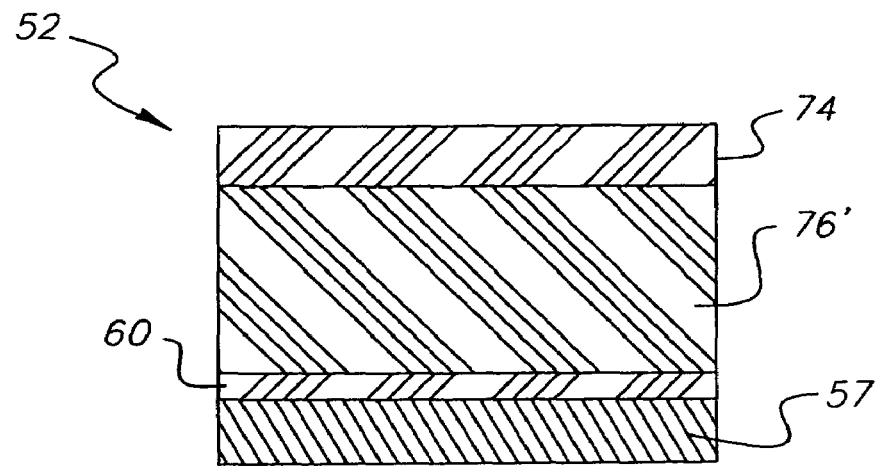
FIG. 23c is a side view of a spatial light modulator with heat sink.
Figure 23D:
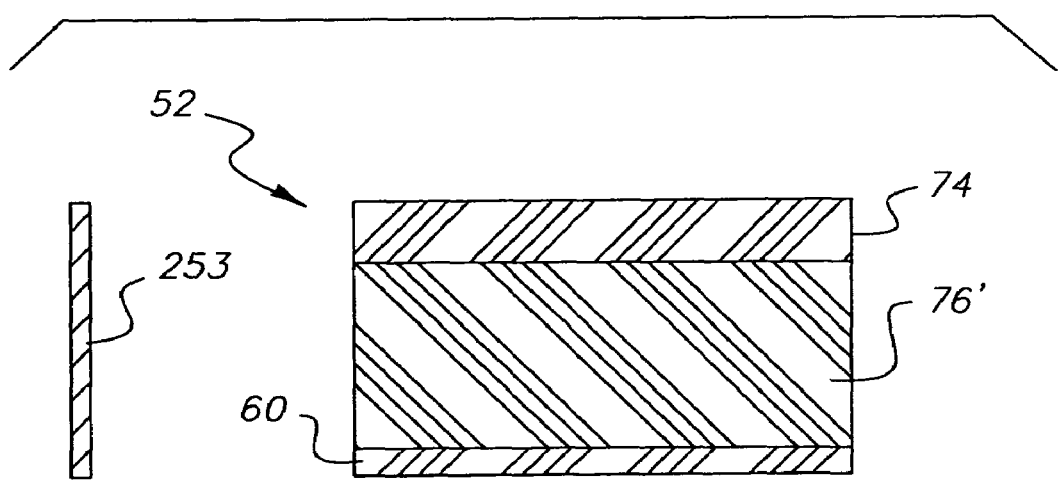
FIG. 23d is a side view of a spatial light modulator with a fan.

This situation is further complicated when the temperature profile at the device is spatially varying. If there is a spatial gradient to the thermal profile at the device, there will be a corresponding reflectance, brightness, contrast, and resulting uniformity gradient. The immediate solution is to control the temperature of the device 52 or the surrounding area to be a predetermined constant. This control may either be achieved by heating or cooling. One method is to control the environmental temperature through localized temperature control such as air circulation or a fan 253 as is shown in FIG. 23d. Another is to provide a heat sink 57 at the device, a heater 56, or a thermo-electric cooler (TEC) 55 behind the spatial light modulator (behind or integrated with the back of the device) to control the temperature as is shown in FIGS. 23a–d.

Another complication arising from the manufacturing process is the stress at the device. A device manufactured at a fixed temperature may display a certain flatness or curvature at that temperature. The flatness corresponds to a flat field uniformity. At a different temperature the uniformity of the light reflected off (or transmitted through) the imager maybe completely different. Controlling the temperature can allow the device to contain a signature flatness or uniformity that can be corrected out using image data manipulation.

Figure 24:
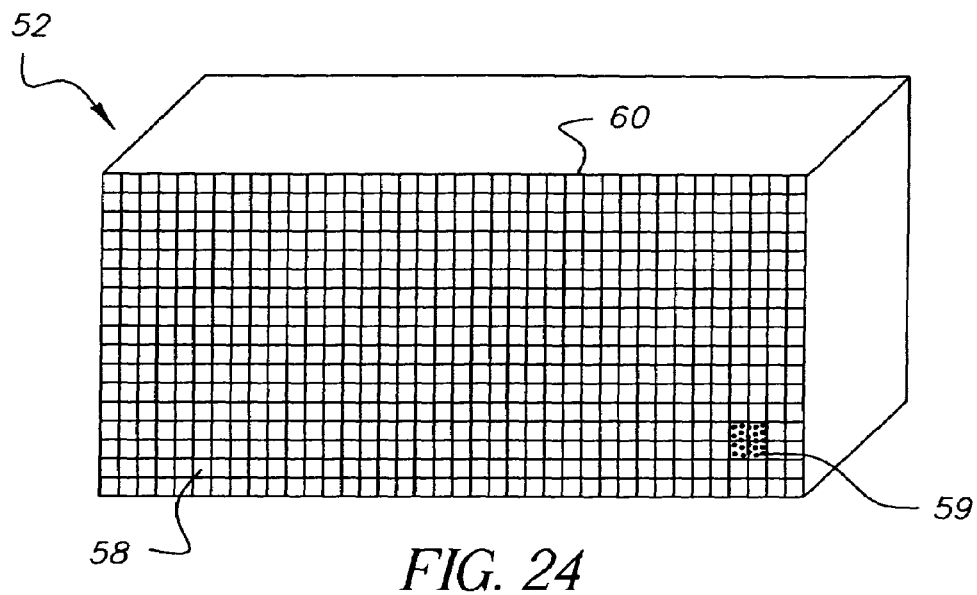
FIG. 24 is a perspective view of a spatial light modulator with a multi-element temperature profile controller.

Alternatively, if the response of the device is known both for every spatial location as well as a function of temperature, the operating system can contain a map. This map or temperature profile would allow calculation of a 2-dimensional thermal profile, that when maintained at the device, delivers the best system uniformity. In effect, the spatial thermal gradient can provide a calculated profile that corrects for image non-uniformities not only at the device, but elsewhere in the system. Such an arrangement would require means to control the temperature at the device as is shown in FIG. 24 where the reflective spatial light modulator 52 has a multi-element temperature control 58 with individual elements 59 on the back of the device 60 (the back of the device may be the reflective side 60 of the device 52).

Figure 25:
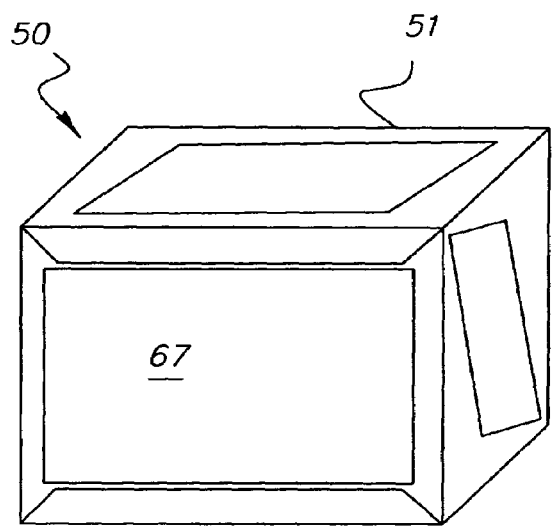
FIG. 25 is a perspective view of a beamsplitter with a temperature controlled housing.

The second thermally sensitive element is the beamsplitter. In particular, if a polarizing beamsplitting cube 50 is employed the temperature at the cube must be maintained and not provide a strong gradient. The coatings and adhesives in such a cube can cause variations in transmission and reflection as a function of temperature. These variations can also vary as a function of wavelength. Using air temperature control surrounding the cube may provide advantages. Alternatively, the cube mount 51 can contain temperature control while maintaining clear windows 67 as is shown in FIG. 25.

Figure 26:
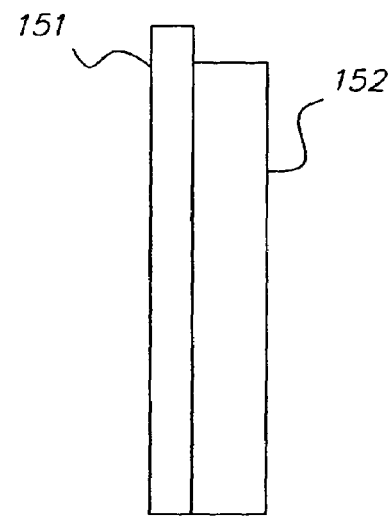
FIG. 26 is a perspective view of a temperature controlled platen.

The third thermally sensitive point is the media plane. In particular, when used with thermally sensitive media, it is important that the media plane not impart either a temperature gradient, or simply overheat and activate the media. Controlling the environmental temperature through air cooling or heating is one option. The other is to use a temperature controller 152 to heat, cool, or sink the platen 151 at image plane 150 as is shown in FIG. 26.

Color Sequential Operation

For applications such as photofinishing, printing is fundamentally polychromatic. There is different data for each color plane and different operating conditions for the system. First, the light source must be capable of illuminating the modulator color sequentially. This can be accomplished by color sequentially operating LEDs, lasers or other individual light sources. Alternative a lamp with a filter wheel can be employed. Data must be provided to the spatial light modulator color sequentially. The illumination must correspond with the data provided at the spatial light modulator. The operating conditions of the modulator such as the operating voltages, the electro-optics response, and any color specific look up tables should be provided to the modulator in synchronous with the illumination. It is possible that the required contrast or media sensitivity will vary with color. The appropriate voltages, uniformity maps, and look up tables need to be provided with the color specific data and illumination. This may require altering the backplane voltage as a function of illumination wavelength. In addition, it may be necessary to turn off the illumination between exposures (even within a single composite image) to allow residuals (residual images) to decay.

Thermal maps may vary with color. While it is possible to update the map as a function of illumination wavelength and date, it may not be practical as the thermal time constant may be too slow to enable efficient operation. A single thermal map is a better choice. That map may simply be a flat, uniform temperature profile.

Alternative Embodiments for Image Forming Assembly 10 Components

Figure 10:
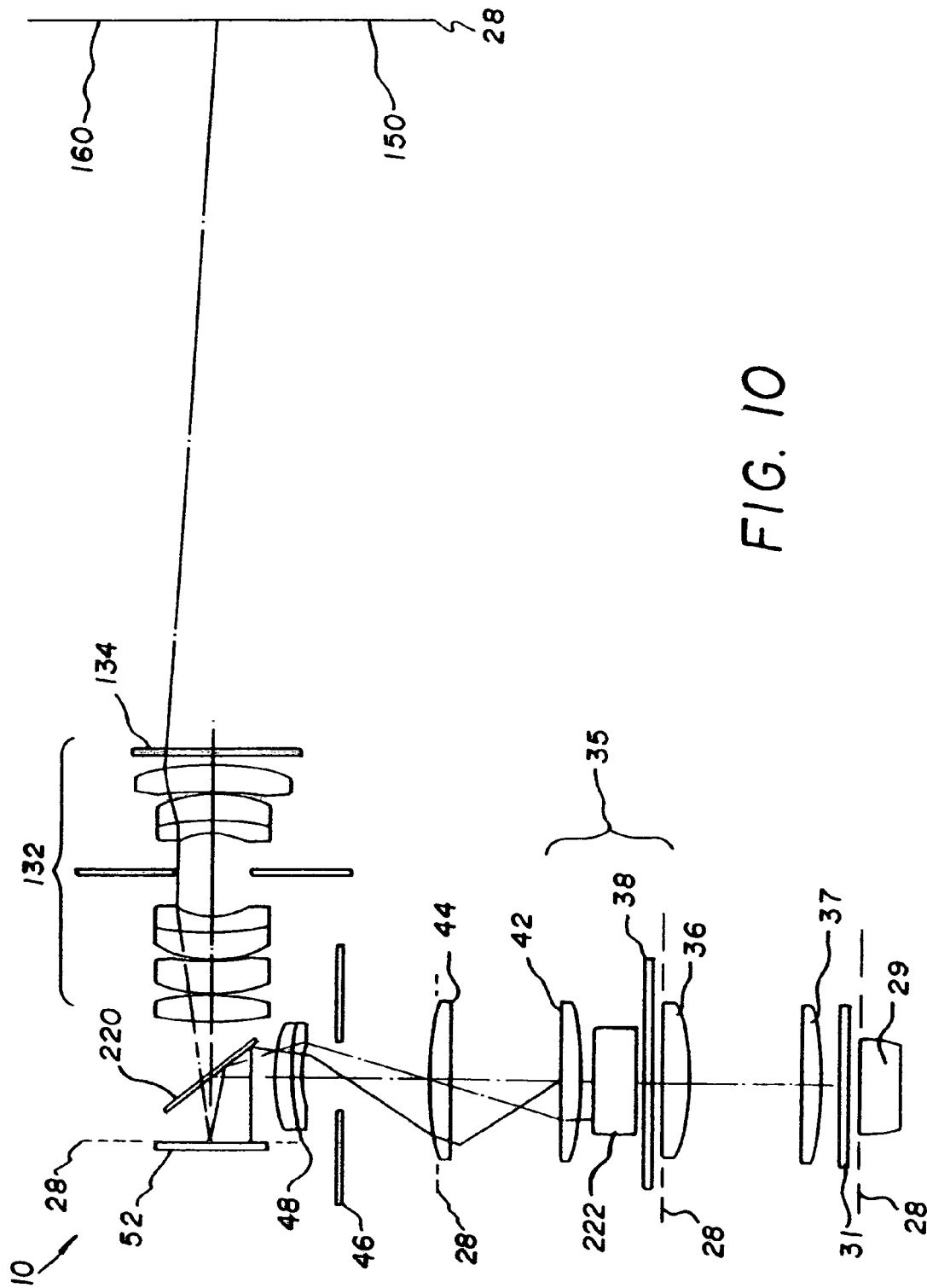
FIG. 10 is a schematic view showing image forming assembly components for a printing apparatus of the present invention, using an alternative arrangement of image forming assembly components.
Figure 11:
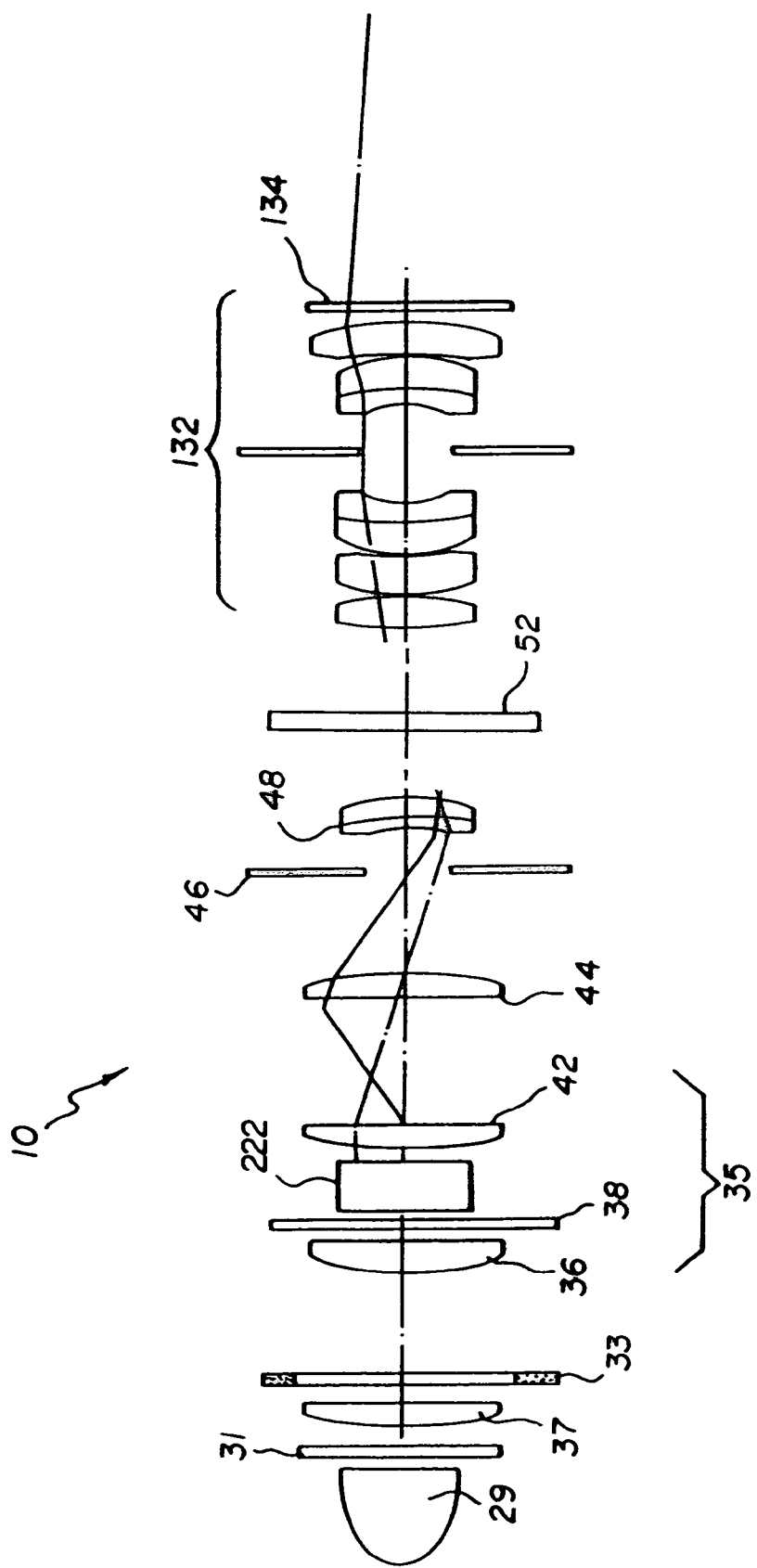
FIG. 11 is a schematic view showing image forming assembly components for a printing apparatus of the present invention, showing an alternative arrangement utilizing a transmissive LCD.

The design of printer 100 allows a number of alternate embodiments within the scope of the present invention. Referring to FIGS. 10 and 11 there are shown possible alternate arrangements of components for image forming assembly 10. Notable changes to components include the following:

(1) Use of alternative light sources. Light sources can include a lamp and filter. Alternatively lasers (solid state, gas, fiber) provide an excellent light source as do light emitting diodes. In the case where the printer is operated color sequentially, the light source may be a combination of illumination elements or a lamp with a filter wheel assembly.

Most available light sources do not provide sufficient uniformity on their own. If and when light sources of sufficient uniformity become available, uniformizing optics may not be necessary.

(2) Use of an alternative uniformizing component, such as an integrating bar 222 in place of lenslet array assembly 40. While lenslet arrays, in general, may provide better uniformity, integrating bar 222 can be an appropriate substitute for monochromatic printing applications, particularly when using coherent light sources, such as lasers. The integrating bar may help to minimize coherence effects. Another method of providing uniform illumination is to incorporate fibers with a fiber faceplate or fiber fabric. The uniformizer can be incorporated into the first lens assembly as can any filters, or prepolarizers.

(3) Use of an alternative to polarization beamsplitter 50. A pellicle 220 can provide sufficient beamsplitting capability for monochromatic printing and can offer cost-saving advantages over polarization beamsplitters 50. Pellicles 220 are well suited to monochromatic applications, such as is disclosed above (but may cause image artifacts with polychromatic systems).

Specifically, pellicles 220 do not extinguish or redirect light with the efficiency of a beamsplitting cube. In addition, over a narrow wavelength band, some pellicles 220 can demonstrate interference effects. For example, if an optical system were to have competing narrow wavelength bands, such as 630 nm and 460 nm, interference effects in the different wavelength regions could cause significantly non-uniform illumination at the modulator. Additionally, pellicles 220 are more useful in systems where light intensity is not a major concern, since pellicles are not designed for applications using high levels of optical power. It should be noted that, because the pellicle is not, by itself, a polarization-sensitive device, a prepolarizer or polarized light source is helpful. If used in image forming assembly 10 of the present invention, the first polarizer would eliminate 50% of incident unpolarized light; the pellicle would then eliminate another 50% of the remaining light. Because of this, spatial light modulator 52 would receive only 25% of the potential illumination. It is instructive to note that, in image forming assembly 10 as described above, light intensity demands are not severe and illumination is monochromatic for any given exposure, allowing the use of pellicle 220 as an alternative.

Another polarizing beamsplitter consists of a wire grid polarizer. Such a polarizer can be used in either reflection or transmission. When using a wire grid polarizer, care must be taken to choose the appropriate polarization state from the illuminator.

(3) Use of alternate beam-steering components. Suitable alternatives for beam steering other than use of polarization beamsplitter 50 or pellicle 220 include a simple turning mirror or prism.

(4) Use of transmissive LCD components for spatial light modulator 52. For some COM applications, there may be sufficient resolution and contrast available using a transmissive LCD spatial light modulator. As is shown in FIG. 11, use of a transmissive modulator for spatial light modulator 52 removes the turn in the optics path and can simplify the design.

(5) The imaging or printing lens assembly images the light onto an image plane. The lens assembly can include an exit polarizer if it is necessary. Furthermore the lens assembly and the beamsplitter may be one integrated assembly. In order to print a variety of sizes, the lens assembly may contain lenses on a turret designed to provide different magnifications, (which may occur at different image positions). Alternatively, the lens assembly may contain a zoom lens, or a "quasi-zoom" capable of imaging at discrete, different magnifications.

(6) The media can be selected from a variety of media such as COM media, AgX media, and dry silver media according to the application.

(7) The media plane or platter 151 may need to be thermally controlled. Control can be established by controlling the environment around the media plane or controlling the temperature at the media plane with a temperature controller 152. For example, the entire media plane can attach to a heat sink or a heater.

Because of the digital addressability of the LCD device and the flexibility in varying level of illumination, the printing solutions described above provide an adequate bit depth and reasonable timing for use in a COM printer. Using the printer of the present invention takes advantage of economical, commodity LCD technology to produce low cost, high resolution prints, with high productivity.

The use of reflective liquid crystal technology allows for very high resolution two-dimensional printing. Furthermore, the use of dithering, particularly sub-apertured dithering, provides means to further increase the resolution and avoid artifacts due to modulator site failure.

Preferred Embodiment for Light Source 29

Figure 12:
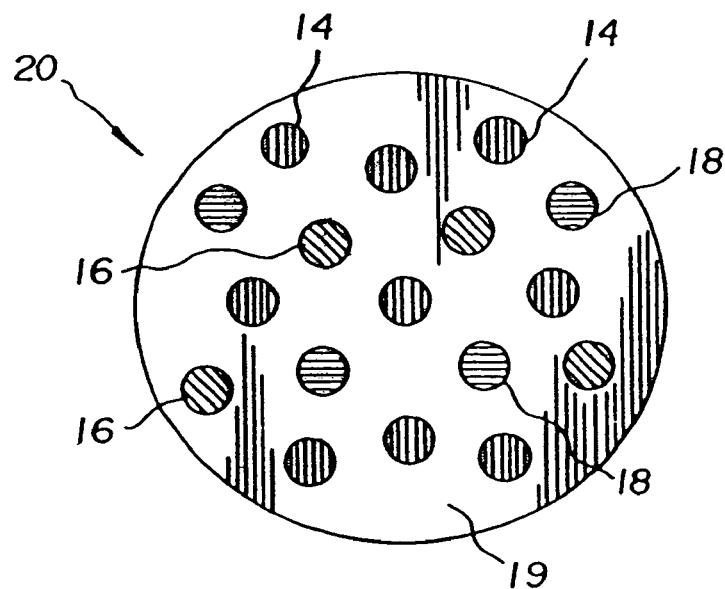
FIG. 12 is a plan view showing a two-dimensional arrangement of LEDs used as part of a light source selector.

Light source 29 of illumination optics 11 must provide light at a wavelength that is best suited to the sensitivity of photosensitive media 160. In the present invention, light source 29 is selectable, allowing printer 100 to utilize any of a number of different types of photosensitive media 160. In the preferred embodiment, light source 29 comprises one or more LEDs, grouped by emitted wavelength. Referring to FIG. 12, there is shown an arrangement of LEDs within a circular aperture 20, for example: red wavelength LEDs 14, green wavelength LEDs 16, and blue wavelength LEDs 18. With this arrangement, the LEDs are distributed so as to provide exposure light evenly. LEDs of a desired color are energized under the control of control logic processor 210, based on the wavelength required for a specific photosensitive media 160. Using this illumination method, printer 100 can be automatically adapted to use one or another type of photosensitive media 160 and to provide the required exposure characteristics needed by that type of media 160. For a media 160 that is intended for exposure by red light only, control logic processor 210 would enable red wavelength LEDs 14, for example. The illuminator can also be used color sequentially.

Figure 13:
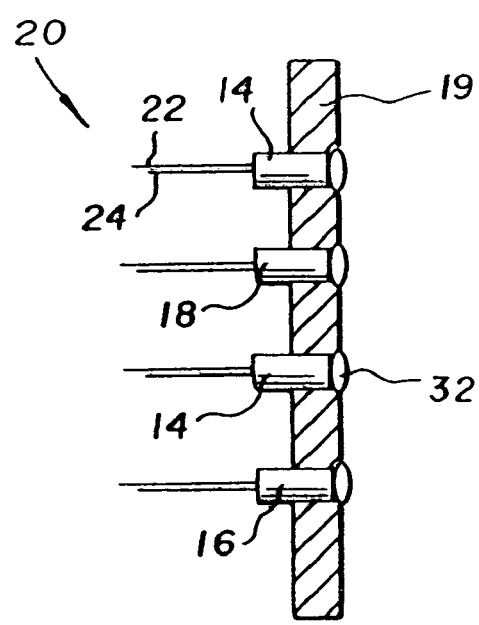
FIG. 13 is a cross-sectional view of an apparatus for holding LEDs and collimating lenses for LEDs.

Referring to FIG. 13, there is shown a cross-sectional view of red LEDs 14, green LEDs 16, and blue LEDs 18 mounted with collimating lenses 32 into a frame 19. Individual collimating lenses 32 are optional but might be useful to aid in encapsulation and position of LEDs 14, 16, and 18.

Figure 14:
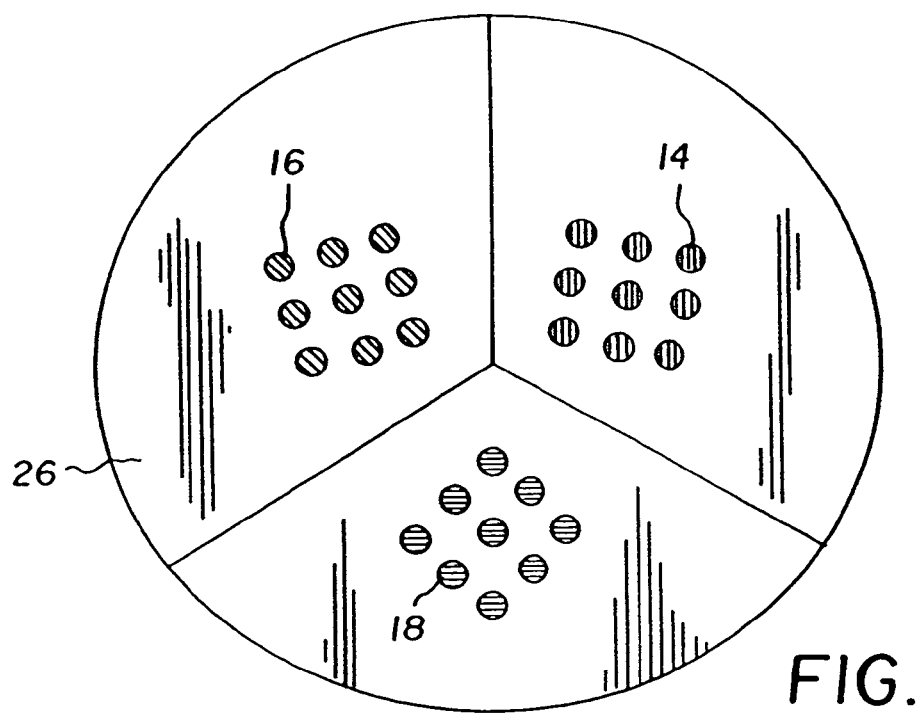
FIG. 14 is a plan view of a rotatable wheel of LEDs used as part of a light source selector.

Referring to FIG. 14, there is shown another alternative embodiment using LEDs 14, 16, and 18. A rotatable LED wheel 26 comprises grouped LEDs 14, 16, and 18 that can be rotated into position by control logic processor 210 for providing exposure energy. The arrangement of FIG. 14 might be most suitable where it is advantageous to obtain concentrated light energy from a close grouping of multiple LEDs 14, 16, and 18. However, the disadvantage presented using the arrangement of FIG. 14 relates to rotation of rotatable wheel 26, since this requires an added motor or manual operation. The preferred embodiment would use distributed LEDs 14, 16, and 18 as shown in FIG. 12, arranged for selective energization as electronically switched by control logic processor 210. The arrangement of FIG. 12 requires no moving parts and can be implemented at lower cost than that shown in FIG. 14.

LEDs 14, 16, and 18 would be specified based on exposure sensitivity characteristics of each type of photosensitive media 160 to be used in printer 100. A number of alternate arrangements are possible, including use of LEDs of any suitable color, emitting the desired wavelength. For example, different groupings of red LEDs could be used for types of media 160 that differ only slightly in terms of wavelength response. A single LED could be used for any one media 160 type; however, the use of multiple LEDs provides additional output intensity to be directed by image forming assembly 10.

Alternate Light Source 29 Options

There are a number of other alternatives for light source 29 that would allow the use of multiple types of photosensitive media 160 to be used by the same printer 100. For example, a halogen lamp could be used to provide a broadband light beam transmitted through filter elements (for example, red, green, or blue filter) to provide a monochromatic light beams. Optionally, lasers could also be employed as light sources 29.

Automated Sensing of Media 160 Width and Response

As an option, an automated mechanism could be employed to detect the width of a loaded photosensitive media 160 and to automatically select the appropriate output format based on the width of media 160 detected. Referring back to FIG. 1, a sensor 234, connected to control logic processor 210, is disposed to sense an encoding 236 that is coupled to media supply 202. There are a number of possible configurations for sensor 234 and encoding 236, including the following, for example:

| Where encoding 236 has the form: | Sensor 236 would be: |
|---|---|
| Barcode or other optical encoding | Barcode reader or other optical reader, such as built-in or hand-held scanner. |
| Transponder containing a memory that includes identifying data for the media, such as an RF transponder, "SAMPT" (Selective Addressable Multi-Page Transponder), part number "RI-TRP- | Transceiver, such as an RF transceiver, for example, "Model S2000"™ transceiver, available from Texas Instruments, Incorporated, |

-continued

| Where encoding 236 has the form: | Sensor 236 would be: |
|---|---|
| IR2B" available from Texas Instruments, Incorporated. | located in Dallas, Texas, USA. |
| Magnetically encoded strip | Magnetic strip reader |
| Memory device, such as an I-button, manufactured by Dallas Semiconductor Corp., Dallas, TX | I-button reader |
| Trace pattern, such as an embedded trace pattern | Trace pattern reader |

Encoding 236 could be printed or attached to media 160 packaging or could be provided from a network connection or manually entered by an operator. Using this option with the preferred embodiment, upon sensing media 160 width from encoding 236, control logic processor 210 would respond by using the preferred output format for imaging onto media 160. Encoding 236 could include dimension data, for example, or could even include instructions or an algorithm that controls printer 100 response to the media 160 type that is loaded.

A mechanical, electromagnetic, or optical sensor (not shown) could alternately be used to indicate media 160 width.

It can readily be seen that printer 100 can be adapted to accept media 160 in any of a set of widths, with only minor modifications to media handling hardware. This would allow, therefore, printer 100 to handle a range of media 160 types, resulting in cost benefits and increased efficiency.

Output Formats

FIGS. 17 through 22 illustrate some examples of possible layouts for output images 250 exposed onto photosensitive media 160 for a COM application. It must be stressed that the layouts shown in FIGS. 17 through 22 are by way of example, and are not by way of limitation. Many similar formats could alternately be used, within the scope of the present invention. Images 250 and photosensitive media 160 are representative only and are not drawn to scale.

Figure 17A:
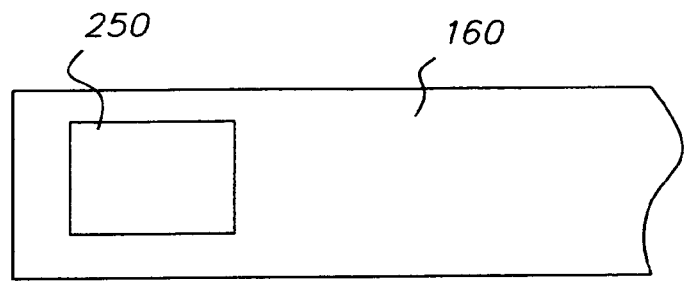
FIGS. 17a and 17b are plan views that illustrate prior art layout formats using a narrow-width COM media.
Figure 17B:
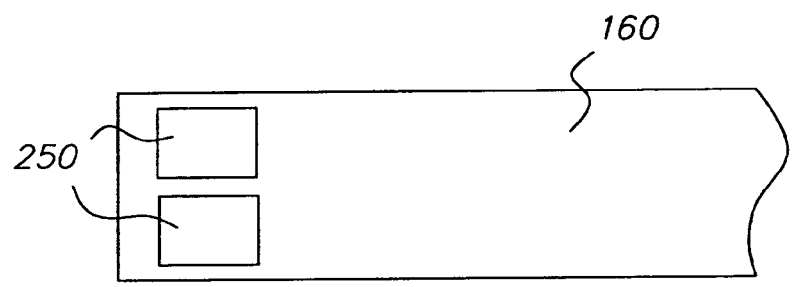
Figure 18A:
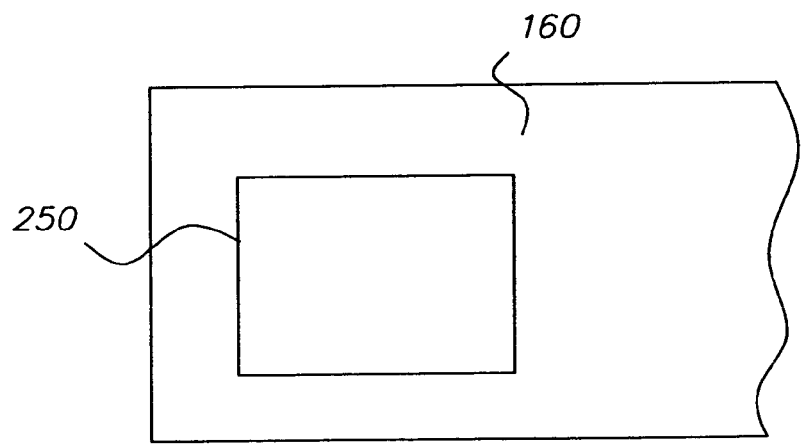
FIGS. 18a–18d are plan views that show additional possible layout formats using a larger-width COM media.
Figure 18B:
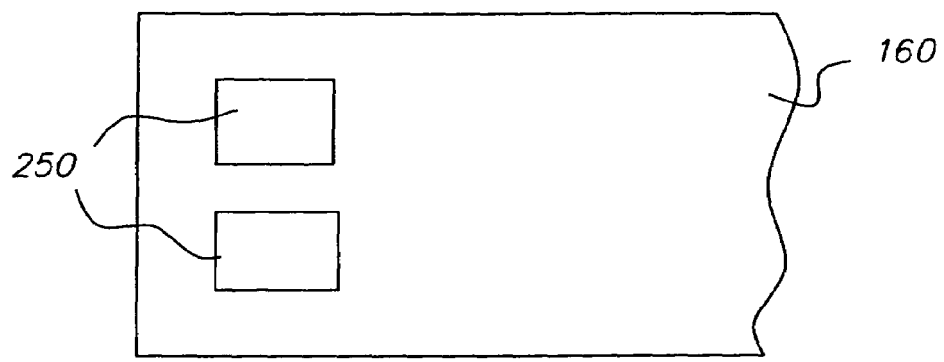
Figure 18C:
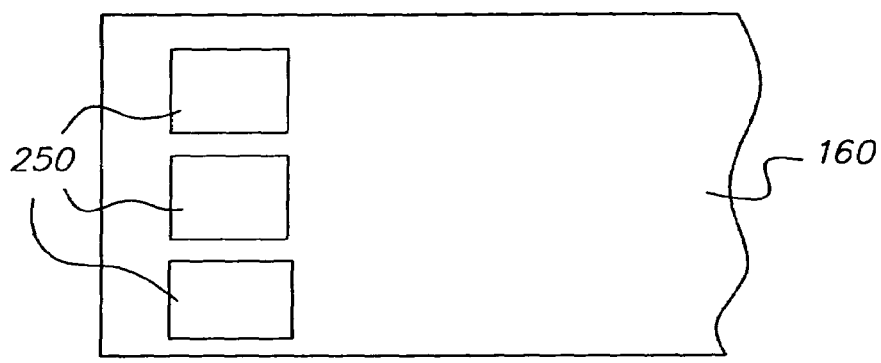
Figure 18D:
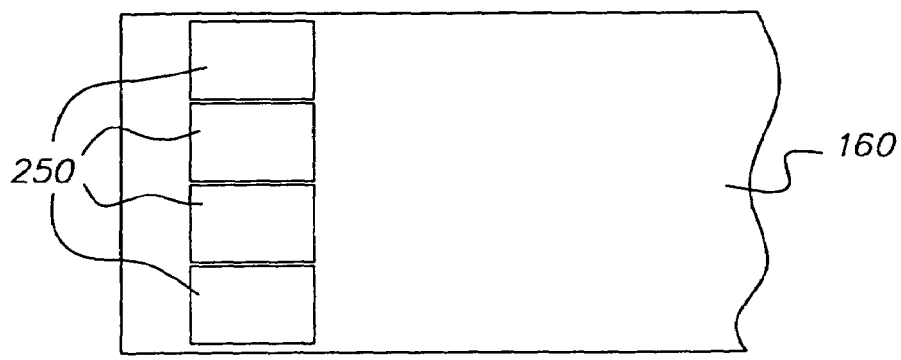

Referring to FIGS. 17*a* and 17*b*, there are shown typical layout formats conventionally used for output images 250 imaged onto photosensitive media 160, where media 160 is narrow-width, 16 mm microfilm. Output image 250 for FIG. 17*a* could be, for example, an A4 sized image at 24× reduction. Output images 250 in FIG. 17*b* could be, for example, A4 sized images at 40× reduction. The arrangement of FIG. 17*b* could be used for the front and back of the same document, for example.

Referring to FIGS. 18*a* through 18*d*, there are shown exemplary layout formats for output images 250 imaged onto photosensitive media 160, where media 160 is wider 35 mm microfilm. As FIGS. 18*a* through 18*d* show, the use of wider 35 mm microfilm allows reduction of larger documents and also allows a flexible number of alternate arrangements for other documents. Output image 250 in FIG. 18*a* could be, for example, an A4 sized image at 20× reduction or an A3 sized image at 24× reduction. Output images 250 in FIG. 18*b* could be, for example, two A3 sized images at 40× reduction or two A4 images at 32× reduction. Output images 250 in FIG. 18*c* could be, for example, three A4 sized images at 32× reduction. The arrangement of FIG. 18*c* might be well suited, for example, for storing grayscale versions of color separations, such as the additive red, green, and blue separations, or the subtractive cyan, magenta, and yellow separations. Output images 250 in FIG. 18*d* could be, for example, four A4 sized images. The arrangement of FIG.

18*d* might be well suited, for example, for storing front and back sides of two separate documents or for storing four different documents. Using spatial light modulator 52, output images 250 in FIGS. 18*b*, 18*c*, and 18*d* can be exposed simultaneously.

Figure 19A:
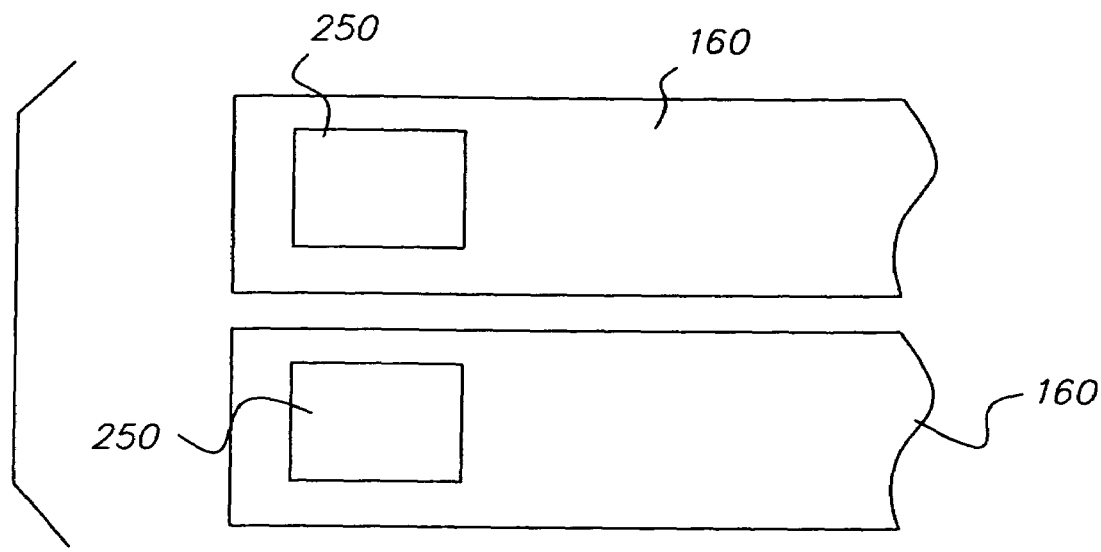
FIGS. 19a and 19b are plan views that show possible layout formats that are imaged in a single exposure onto multiple segments of COM media.
Figure 19B:
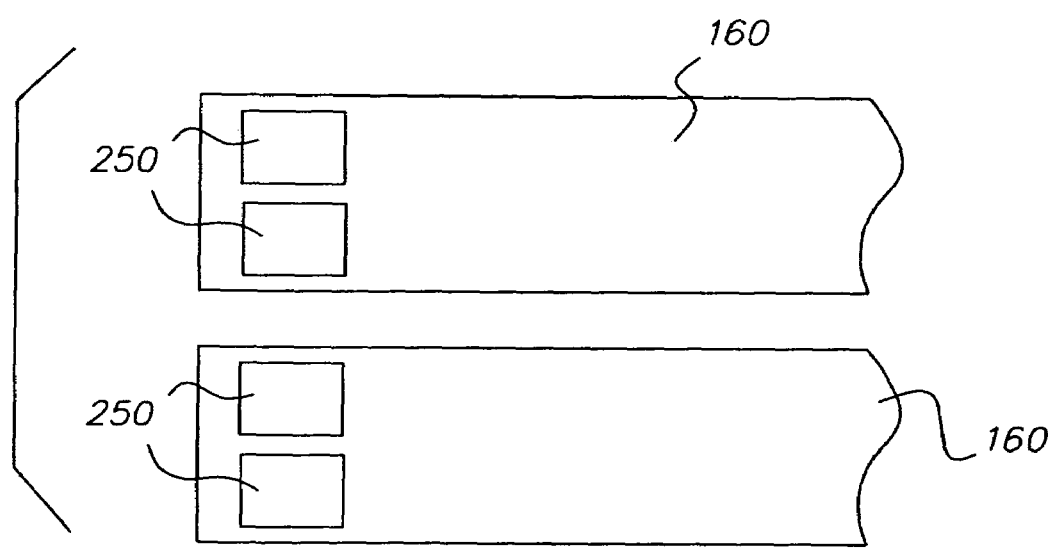

Referring to FIGS. 19*a* and 19*b*, there are shown exemplary layout formats for output images 250 imaged onto photosensitive media 160, where media 160 is made up of two widths of 16 mm microfilm, both disposed at image plane 150 at the same time. The 2-up arrangement of FIG. 19*a* shows two images in similar format to that illustrated in FIG. 17*a*. The 4-up arrangement of FIG. 19*b* shows four images in similar format to that illustrated in FIG. 17*b*. Using spatial light modulator 52, output images 250 in FIGS. 19*a* and 19*b* can be exposed simultaneously, effectively doubling the productivity.

Figure 20A:
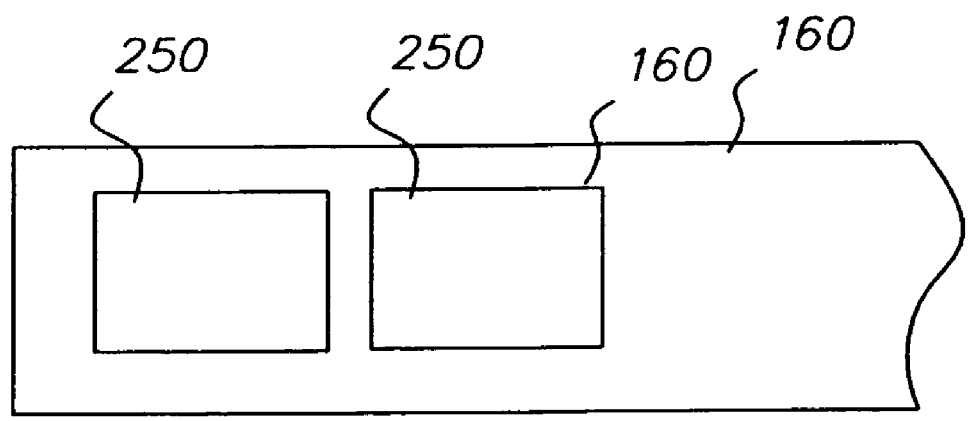
FIGS. 20a and 20b are plan views that show possible layout formats that are imaged in a single exposure onto a narrow-width COM media.
Figure 20B:
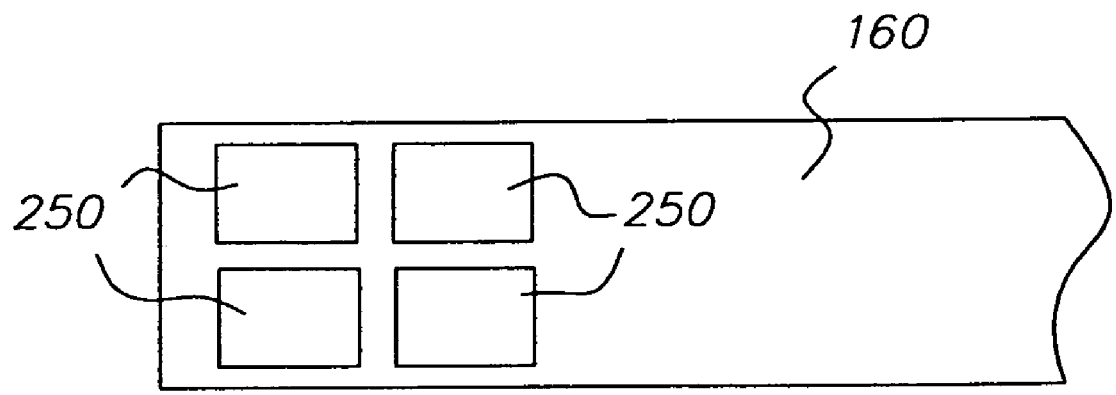
Figure 21A:
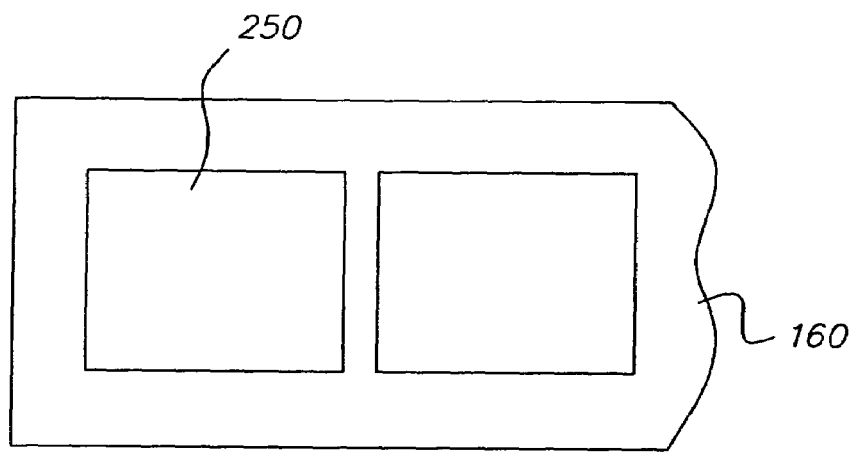
FIGS. 21a–21d are plan views that show possible layout formats imaged in a single exposure onto a larger-width COM media.
Figure 21B:
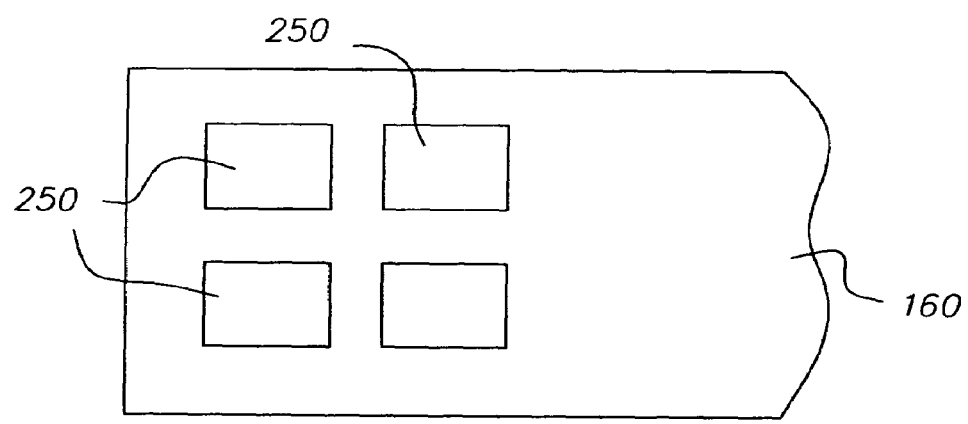
Figure 21C:
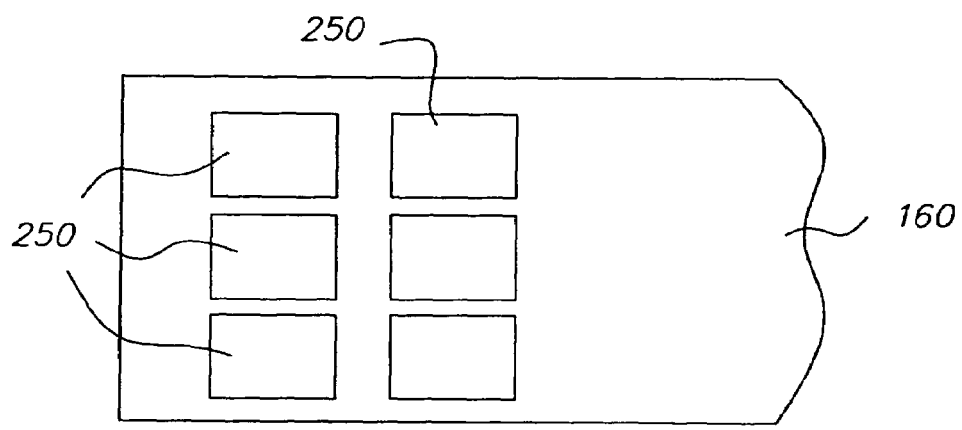
Figure 21D:
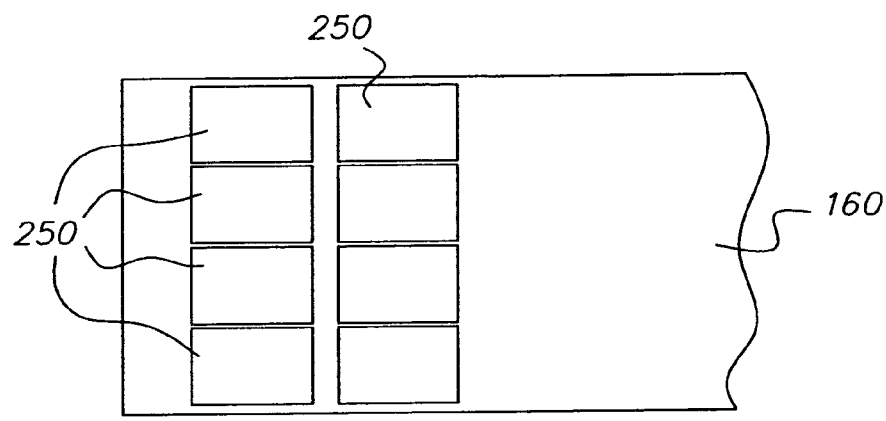

Referring to FIGS. 20*a* and 20*b*, there are shown exemplary layout formats that can be employed for simultaneous exposure of multiple output images 250 onto photosensitive media 160, where media 160 is narrow-width, 16 mm microfilm. The arrangement of FIGS. 20*a* and 20*b* is similar to the arrangement shown in FIGS. 17*a* and 17*b*, with the advantage that, using spatial light modulator 52, both output images 250 in FIG. 20*a* and all four output images 250 in FIG. 20*b* can be exposed simultaneously.

Referring to FIGS. 21*a* through 21*d*, there are shown exemplary layout formats for output images 250 imaged onto photosensitive media 160, where media 160 is wider, 35 mm microfilm. Using spatial light modulator 52, all output images 250 in each format shown in FIGS. 20*a* through 20*d* can be exposed simultaneously, with substantial gains in throughput.

Figure 22A:
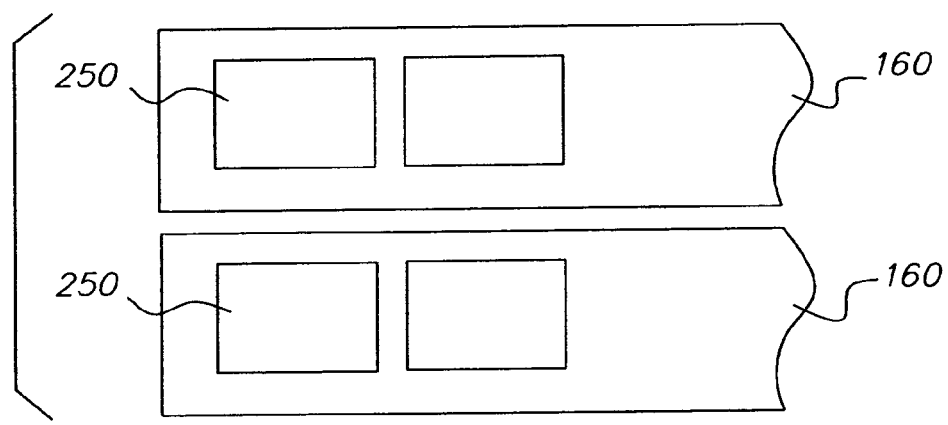
FIGS. 22a and 22b are plan views that show additional possible layout formats that are imaged in a single exposure onto multiple segments of COM media.
Figure 22B:
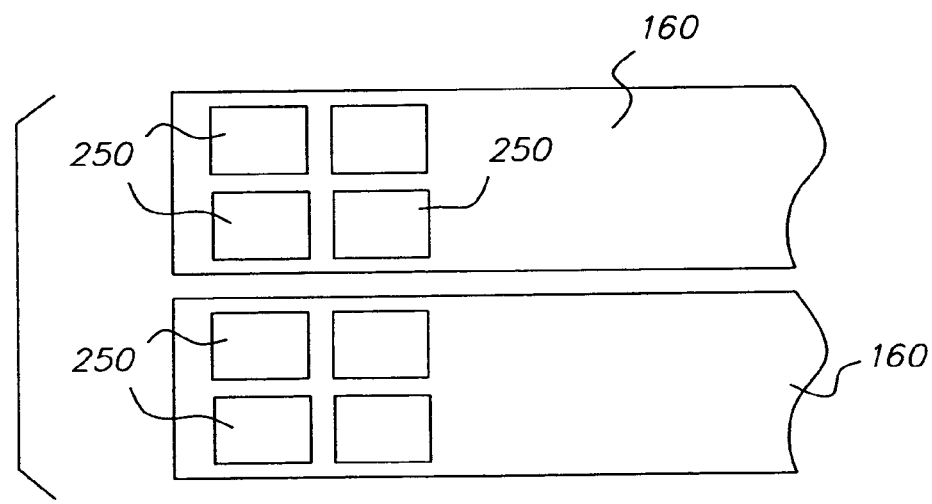

Referring to FIGS. 22*a* and 22*b*, there are shown exemplary layout formats for output images 250 imaged onto photosensitive media 160, where media 160 is narrower, 16 mm microfilm. Using spatial light modulator 52, all output images 250 in each format shown in FIGS. 22*a* and 22*b* can be exposed simultaneously, with substantial gains in throughput.

As can readily be appreciated from FIGS. 17 through 22, the use of spatial light modulator 52 provides distinctive advantages for COM output imaging, allowing a varied arrangement of output image 250 formats onto photosensitive media 160 having a range of widths, even where two rolls of media 252 supply two segments of media 160 as illustrated in FIGS. 19*a*, 19*b*, 22*a*, and 22*b*.

Alternative Use of Multiple Spatial Light Modulators

Figure 15A:
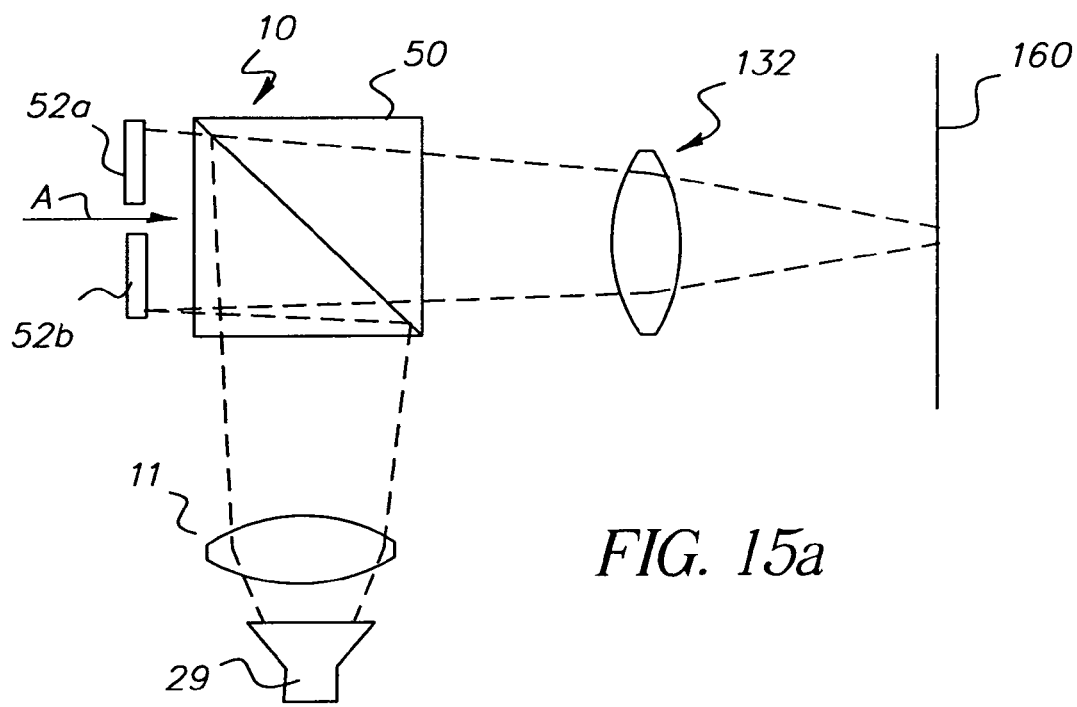
FIG. 15a is a schematic view of exposure optics showing an arrangement using multiple reflective spatial light modulators.
Figure 15B:
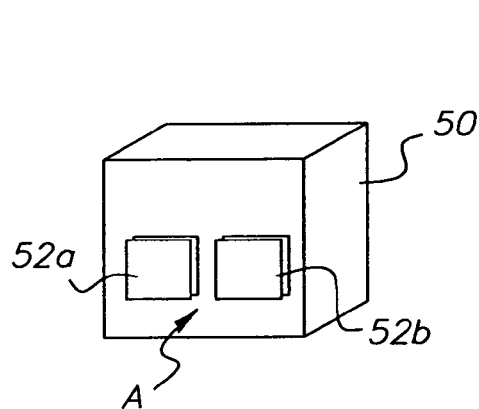
FIGS. 15b and 15c show possible horizontal and vertical arrangement of spatial light modulators relative to a beamsplitter component.
Figure 15C:
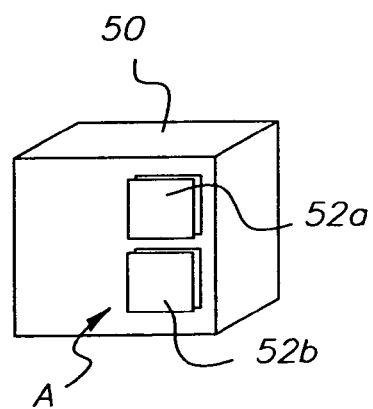

There may be limitations or cost benefits that make it advantageous to employ multiple spatial light modulators 52 instead of using a single, larger spatial light modulator 52. Referring to FIG. 15*a*, there is shown one possible arrangement using multiple spatial light modulators 52*a* and 52*b*, both disposed on the same side of polarization beamsplitter element 50. Using such an arrangement, it would be possible to write different parts of a larger image onto media 160 using tiling techniques that are familiar in the imaging arts. Alternately, using multiple spatial light modulators 52, different documents could be written to COM media 160 at the same time, such as to provide the 2-up arrangement shown in the example of FIG. 17*b*. Spatial light modulators 52 can be disposed in a number of arrangements with respect to polarization beamsplitter element 50. Referring to FIGS. 15*b* and 15*c*, there are shown possible arrangements of spatial light modulators 52*a* and 52*b*, disposed horizontally and vertically with relation to each other. Dotted reference line A in FIG. 15*a* corresponds to the same reference line A in FIGS. 15*b* and 15*c*. Two spatial light modulators 52 are shown; however, more than two spatial light modulators 52 could be disposed horizontally and/or vertically with relation to each other on the same face of polarization beamsplitter element 50.

Figure 16A:
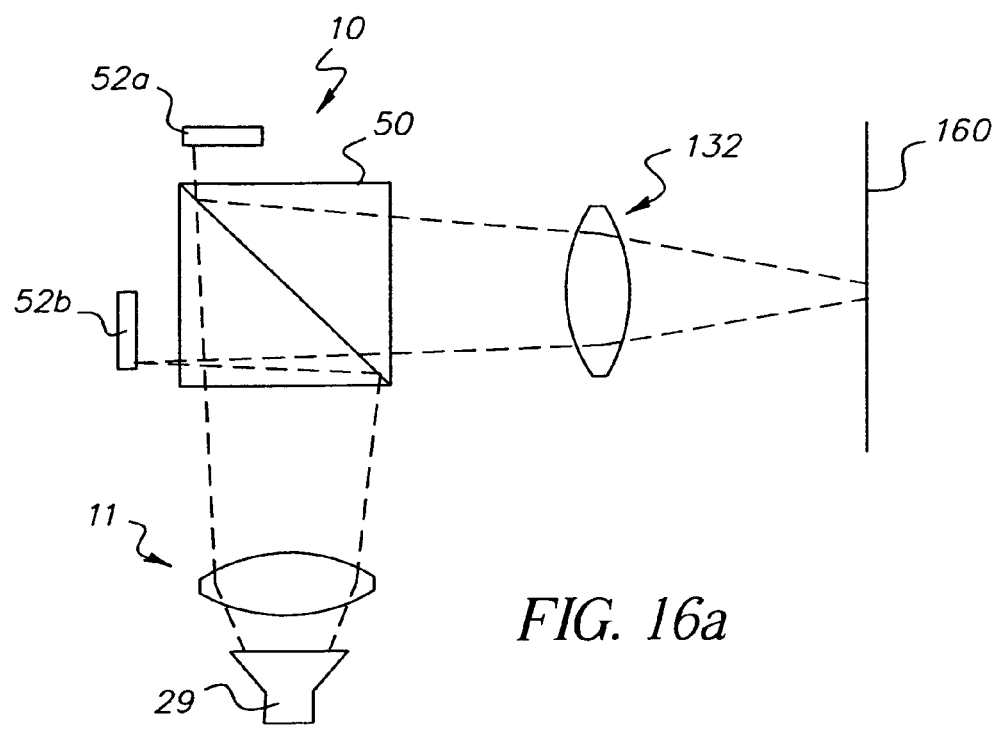
FIGS. 16a and 16b are schematic views of exposure optics showing alternate arrangements using multiple reflective spatial light modulators.
Figure 16B:
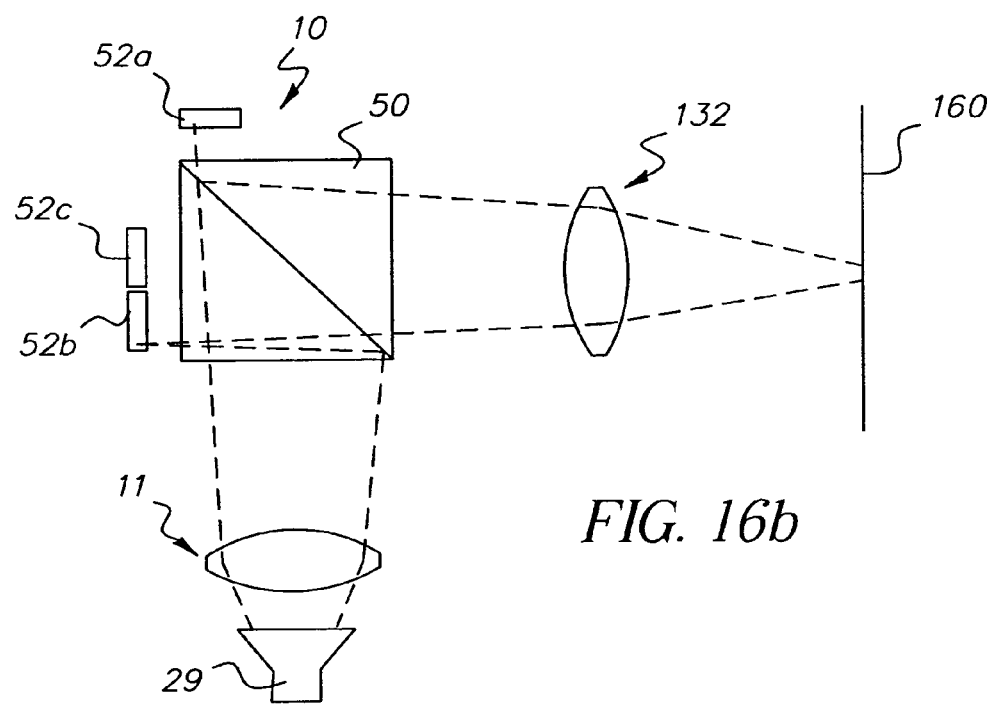

Referring to FIG. 16*a*, there is shown an alternate arrangement using multiple spatial light modulators 52*a* and 52*b* that are each disposed parallel to a different face of polarization beamsplitter element 50. More than two spatial light modulators 52 could be used, such as to provide large format or 2-up printing or for the arrangements shown in FIGS. 17 through 22. FIG. 16*b* shows yet another possible arrangement using three spatial light modulators 52*a*, 52*b*, and 52*c*. A number of other possible arrangements using three or more spatial light modulators 52 on different sides of polarization beamsplitter element 50 could be used, in addition to those shown in FIGS. 16*a* and 16*b*.

The arrangements of FIGS. 15*a*, 15*b*, 15*c*, 16*a*, and 16*b* could also employ a pellicle 220 for directing the beam as an alternative to polarization beamsplitter element 50.

Using image forming assembly 10 of the present invention, it can be seen that a single printer 100 can be configured to allow loading of photosensitive media 160 having any one of a number of suitable width dimensions, and to adjust its output imaging characteristics in order to record output images in an appropriate format for media 160 having that width dimension. Printer 100 can prompt an operator to specify one of a set of available output formats, based on the width dimension detected.

Simultaneous Exposure of Multiple Output Images

As illustrated in FIGS. 17 through 22, use of spatial light modulator 52 enables printer 100 to expose multiple images at one time. This capability increases the potential throughput productivity of printer 100 and even allows printer 100 to image simultaneously onto two separate rolls 252 of media 160 at one time.

To effect simultaneous printing of multiple images, it is only necessary to provide the spatial light modulator 52 with a composite image made up of the multiple images, so that different selected groupings of individual modulator sites 53 are driven to display different images at one time. Referring again to FIG. 3, dotted line L shows a possible division of spatial light modulator 52 into two segments or partitions, right and left, for use in 2-up printing. Drive signals for the modulator sites of the two segments originate from a composite image that is formed by two different, smaller images placed side by side. Each segment would then be able to write a separate image 250. As just one example, the right half of modulator 52 could expose the rightmost image 250 of FIG. 20*a* at the same time that the left half of modulator 52 would expose the leftmost image 250 of FIG. 20*a*. Alternately, where multiple modulators are used, each modulator is provided with drive signals from a different image data file at the same time. For example, referring to FIG. 15*a*, 16*a*, or 16*b*, modulator 52*a* could be used to write one image, modulator 52*b* to write another image. Numerous alternative ways of driving partitions of a larger modulator and/or multiple modulators are also possible to effect simultaneous exposure of multiple images, with results such as shown in FIGS. 17–22. It can be readily appreciated that the resulting productivity gains could be substantial.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, photosensitive media 160 could be provided from roll 252 or in some other form. Numerous formats are available for the placement of images onto narrow 16 mm or wider 35 mm media 160. A number of modifications could be made to image forming assembly 10 components without departing from the scope of this invention.

Therefore, what is provided is a film recording apparatus that provides a plurality of output formats using the same exposure optics, allowing the recording of images onto different sizes of media in different formats and allowing the exposure of multiple images at one time.

The invention has been described in detail with particular reference to certain preferred embodiments thereof, but it will be understood that variations and modifications can be effected within the scope of the invention.

PARTS LIST

10. Image forming assembly
11. Illumination optics
14. Red LED
16. Green LED
18. Blue LED
19. Frame
20. Circular aperture
26. LED wheel
28. Conjugate planes
29. Light source
31. Filter
32. Filter Wheel
33. Filter
35. Uniformizer
36. Field lens
37. Lens
38. Linear polarizer
40. Lenslet array assembly
40a. Lenslet array
40b. Lenslet array
41. First lens assembly
42. Field lens
44. Field lens
46. Aperture stop
48. Relay lens
50. Polarization beamsplitter element
51. Temperature controlled mount for beamsplitter
52. Reflective spatial light LCD modulator
52a. Reflective spatial light LCD modulator
52b. Reflective spatial light LCD modulator
52'. LCD modulator
53. Individual modulator site
54. Actuator
55. TEC
56. Heater
57. Heat sink
58. Multi-element temperature controller
59 Single element of temperature controller
60. Reflective or back side of spatial light modulator
61. First modulator position
62. Second modulator position
63. Modulator sites
64. Third modulator position
65. Fourth modulator position
67. Clear window for polarizing beamsplitter
70. Actuator
72. Actuator
74. Cover glass
74'. Cover glass
76. Polarization compensator
76'. LCD
78'. Frame
80. Black regions
82. Clear areas
84. First modulator position
86. Second modulator position
88. Third modulator position
90. Fourth modulator position
92. Modulator sites
94. Non-reflecting region
100. Printer
132. Second lens assembly
134. Polarizer
142. S-polarization state of light
144. P-polarization state of light
150. Image plane
151. Platen
152. Temperature controller
160. Photosensitive media
184. Mask
202. Media supply
204. Exposure section
206. Film processor
208. Film storage unit
210. Control logic processor
212. Media handling subsystem
220. Pellicle
222. Integrating bar
234. Sensor
236. Encoding
250. Output image
252. Roll of media
253. Fan

What is claimed is:

1. A method for printing an image from digital image data onto a photosensitive medium, comprising:
    (a) selecting, from a set of available layout formats, a selected format;
    (b) correlating a grouping of exposure elements on a spatial light modulator with said selected format;
    (c) modulating said grouping of exposure elements based on said digital image data;
    (d) directing an exposure beam toward said spatial light modulator to provide an imaging beam;
    (e) directing said imaging beam toward said photosensitive medium; and
    (f) controlling a temperature profile of said spatial light modulator.

2. The method for printing as in claim 1 wherein the step of selecting comprises the step of sensing a width dimension of said photosensitive medium.

3. The method for printing as in claim 1 wherein a member of said set of available layout formats uses a single image.

4. The method for printing as in claim 1 wherein a member of said set of available layout formats uses a plurality of images.

5. A method for printing an image from digital image data onto a photosensitive medium, comprising:
    (a) selecting, from a set of available layout formats, a selected format;
    (b) correlating a grouping of exposure elements on each of a plurality of spatial light modulators with said selected format;

(c) modulating said grouping of exposure elements on said each of said plurality of spatial light modulators based on said digital image data;
(d) directing an exposure beam toward said spatial light modulators to provide an imaging beam;
(e) directing said imaging beam toward said photosensitive medium; and
(f) controlling a temperature profile of said each of said plurality of spatial light modulators.

6. The method for printing as in claim 5 wherein said plurality of spatial light modulators are disposed on the same side of a beamsplitter element.

7. The method for printing as in claim 5 wherein said plurality of spatial light modulators are disposed on different sides of a beamsplitter element.

* * * * *